United States Patent
Sharma

(10) Patent No.: US 10,389,714 B2
(45) Date of Patent: *Aug. 20, 2019

(54) INCREASED COMMUNICATION SECURITY

(71) Applicant: Idaax Technologies Private Limited, Bengaluru (IN)

(72) Inventor: Vishnu Sharma, Bhubaneswar (IN)

(73) Assignee: Idaax Technologies Private Limited, Bengaluru (IN)

( * ) Notice: Subject to any disclaimer, the term of this patent is extended or adjusted under 35 U.S.C. 154(b) by 324 days.

This patent is subject to a terminal disclaimer.

(21) Appl. No.: 14/231,634

(22) Filed: Mar. 31, 2014

(65) Prior Publication Data

US 2015/0281254 A1    Oct. 1, 2015

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |

(52) U.S. Cl.
CPC .................. *H04L 63/0876* (2013.01)

(58) Field of Classification Search
CPC ....... H04L 63/08; H04L 63/123; H04L 63/12; H04L 63/0876; H04L 63/126; H04L 9/32; H04L 9/3239; H04L 9/3242; H04L 29/06; G06F 21/30; G06F 21/44
See application file for complete search history.

(56) References Cited

U.S. PATENT DOCUMENTS

| | | |
|---|---|---|
| 5,217,003 A | 6/1993 | Wilk |
| 5,875,296 A | 2/1999 | Shi et al. |
| 6,252,873 B1 * | 6/2001 | Vines ............... H04N 21/23424 370/389 |
| 6,377,691 B1 | 4/2002 | Swift et al. |
| 6,879,243 B1 | 4/2005 | Booth et al. |
| 6,882,269 B2 | 4/2005 | Moreno |
| 7,050,875 B2 | 5/2006 | Cribbs et al. |
| 7,538,689 B2 | 5/2009 | Haase |
| 7,552,467 B2 | 6/2009 | Lindsay |
| 7,559,529 B2 | 7/2009 | Affaticati et al. |

(Continued)

FOREIGN PATENT DOCUMENTS

| | | |
|---|---|---|
| IN | 202969 | 11/2006 |
| IN | 2621CHE/2008 | 10/2009 |

(Continued)

OTHER PUBLICATIONS

A. Bhattacharyya, S. Bandyopadhyay, A. Ukil, T. Bose, A. Pal, Lightweight mutual authentication for CoAP (WIP), Mar. 3, 2014.*

(Continued)

*Primary Examiner* — Shewaye Gelagay
*Assistant Examiner* — Amie C. Lin

(57) ABSTRACT

Authentication data may be generated and included in a Constrained Application Protocol (CoAP) message communicated from a first computer system to a second computer system. The authentication data may allow the second computer system to perform message validation for verifying the authenticity of the first computer system and/or the integrity of the CoAP message. And in one embodiment, where the CoAP message includes a nonce, security can be improved by allowing the second computer system to advantageously detect and/or act on a replay attack.

23 Claims, 13 Drawing Sheets

(56) References Cited

U.S. PATENT DOCUMENTS

| | | | |
|---|---|---|---|
| 7,719,422 | B1 | 5/2010 | Steinmetz et al. |
| 7,828,646 | B2 | 11/2010 | Franks, Jr. |
| 8,193,930 | B2 | 6/2012 | Petite et al. |
| 8,500,012 | B2 | 8/2013 | Amdahl et al. |
| 8,612,181 | B2 | 12/2013 | Czaja et al. |
| 2002/0178271 | A1* | 11/2002 | Graham .............. G06F 21/6245 709/229 |
| 2003/0129944 | A1 | 7/2003 | Chang et al. |
| 2005/0004684 | A1 | 1/2005 | Cribbs |
| 2005/0021393 | A1 | 1/2005 | Bao et al. |
| 2005/0033960 | A1* | 2/2005 | Vialen ................... H04L 9/3242 713/170 |
| 2006/0206932 | A1 | 9/2006 | Chong |
| 2006/0237427 | A1 | 10/2006 | Logan |
| 2008/0044014 | A1 | 2/2008 | Corndorf |
| 2008/0178004 | A1* | 7/2008 | Wei ..................... H04L 63/0869 713/171 |
| 2008/0262909 | A1 | 10/2008 | Li et al. |
| 2010/0121693 | A1 | 5/2010 | Pacana |
| 2011/0239283 | A1 | 9/2011 | Chern |
| 2011/0271110 | A1 | 11/2011 | Ohba et al. |
| 2011/0288685 | A1 | 11/2011 | Usem |
| 2013/0024915 | A1 | 1/2013 | Jones et al. |
| 2013/0060642 | A1 | 3/2013 | Shlomot |
| 2013/0232554 | A1 | 9/2013 | Campagna et al. |
| 2014/0067902 | A1* | 3/2014 | Wang ..................... H04L 67/02 709/201 |
| 2014/0143855 | A1 | 5/2014 | Keoh et al. |
| 2014/0244598 | A1* | 8/2014 | Haustein ........... G06F 17/30156 707/692 |
| 2014/0298037 | A1* | 10/2014 | Xiao ..................... H04L 9/3273 713/181 |

FOREIGN PATENT DOCUMENTS

| | | |
|---|---|---|
| IN | 255060 | 1/2013 |
| WO | 2000064745 | 11/2000 |
| WO | 2006073722 | 7/2006 |
| WO | 2012065160 | 5/2012 |
| WO | 2012068591 | 5/2012 |
| WO | 2013087039 | 6/2013 |
| WO | 2014024078 | 2/2014 |
| WO | 2014179623 | 11/2014 |
| WO | 2015047744 | 4/2015 |

OTHER PUBLICATIONS

"Blockwise Transfers in CoAP," from http://tools.ietf.org/pdf/draft-ietf-core-block-14.pdf, Oct. 21, 2013, 31 pages.
"Constrained Application Protocol (CoAP)," from http://tools.ietf.org/pdf/draft-ietf-core-coap-18.pdf, Jun. 28, 2013, 118 pages.
"CoRE Resource Directory," from http://tools.ietf.org/pdf/draft-ietf-core-resource-directory-01.pdf, Dec. 11, 2013, 28 pages.
"Datagram Transport Layer Security Version 1.2," from http://www.rfc-editor.org/rfc/pdfrfc/rfc6347.txt.pdf, Jan. 2012, 32 pages.
"Observing Resources in CoAP," from http://tools.ietf.org/pdf/draft-ietf-core-observe-12.pdf, Feb. 14, 2014, 33 pages.
"Signing and Authenticating REST Requests," Amazon Simple Storage Service Developer Guide, API Version Mar. 1, 2006, from http://docs.aws.amazon.com/AmazonS3/latest/dev/RESTAuthentication.html, accessed on Jan. 15, 2014, 8 pages.
U.S. Office Action, U.S. Appl. No. 14/470,906, dated Aug. 26, 2015.
U.S. Office Action, U.S. Appl. No. 14/470,914, dated Aug. 26, 2015.
U.S. Office Action, U.S. Appl. No. 14/470,914, dated Jun. 14, 2016.
U.S. Office Action, U.S. Appl. No. 14/470,914, dated Mar. 10, 2016.
U.S. Office Action, U.S. Appl. No. 14/470,917, dated Sep. 9, 2015.
U.S. Office Action, U.S. Appl. No. 15/215,847, dated Sep. 30, 2016.
U.S. Office Action, U.S. Appl. No. 15/215,971, dated Apr. 3, 2017.
U.S. Office Action, U.S. Appl. No. 15/660,910, dated Dec. 27, 2017.
U.S. Office Action, U.S. Appl. No. 15/660,910, dated May 30, 2018.
U.S. Office Action, U.S. Appl. No. 15/831,323, dated Feb. 12, 2018.
Ukil, Arijit et al., "Lightweight Security Scheme for Vehicle Tracking System Using CoAP," Proceedings of the International Workshop on Adaptive Security (ASPI 2013), Sep. 2013, 8 pages.
"Using CoAP with IPsec," from http://tools.ietf.org/pdf/draft-bormann-core-ipsec-for-coap-00.pdf, Dec. 6, 2012, 9 pages.
"Wireless Sensor/Actuator Network Design for Mobile Control Applications," from http://arxiv.org/ftp/arxiv/papers/0806/0806.1569.pdf, 2007, 17 pages.
"Access Control Framework for Constrained Environments," from https://tools.ietf.org/pdf/draft-selander-core-access-control-00.pdf, Jul. 5, 2013, 37 pages.
"CoAP Security Options," from https://tools.ietf.org/pdf/draft-yegin-coap-security-options-00.pdf, Oct. 14, 2011, 9 pages.
"Delegated CoAP Authorization Function (DCAF)," from https://tools.ietf.org/pdf/draft-gerdes-core-dcaf-authorize-00.pdf, Jul. 15, 2013, 35 pages.
EESR, European Application No. 15156551.2, dated Aug. 26, 2015.
EESR, European Application No. 15156583.5, dated Aug. 26, 2015.
EESR, European Application No. 15161863.4, dated Aug. 26, 2015.
EESR, European Application No. 15182286.3, dated Jan. 20, 2016.
EESR, European Application No. 15182308.5, dated Jan. 20, 2016.
EESR, European Application No. 15182322.6, dated Jan. 20, 2016.
EESR, European Application No. 15182345.7, dated Jan. 20, 2016.
EPO Communication, European Application No. 15156551.2, dated Feb. 19, 2018.
EPO Communication, European Application No. 15156583.5, dated Feb. 19, 2018.
EPO Communication, European Application No. 15161863.4, dated Feb. 19, 2018.
"Guide to Supervisory Control and Data Acquisition (SCADA) and Industrial Control Systems Security," from https://www.dhs.gov/sites/default/files/publications/csd-nist-guidetosupervisoryanddatacquisition-scadaandindustrialcontrolsystemssecurity-2007.pdf, Sep. 2006, 164 pages.
Jucker, Stefan, "Securing the Constrained Application Protocol," Institute for Pervasive Computing, Department of Computer Science, ETH Zurich, Oct. 10, 2012, 103 pages.
Kelly, S. et al., "Using HMAC-SHA-256, HMAC-SHA-384, and HMAC-SHA-512 with IPsec," Request for Comments 4868, Internet Engineering Task Force, May 2007, 21 pages.
"Remote Sensing and Control for Establishing and Maintaining Digital Irrigation," from http://airccse.org/journal/IJAIT/papers/2112ijait02.pdf, Feb. 2012, 15 pages.
U.S. Notice of Allowance, U.S. Appl. No. 14/231,625, dated Jan. 8, 2016.
U.S. Notice of Allowance, U.S. Appl. No. 14/231,625, dated Jun. 21, 2016.
U.S. Notice of Allowance, U.S. Appl. No. 14/231,625, dated Mar. 24, 2016.
U.S. Notice of Allowance, U.S. Appl. No. 14/231,656, dated Jun. 21, 2016.
U.S. Notice of Allowance, U.S. Appl. No. 14/231,656, dated Mar. 29, 2016.
U.S. Notice of Allowance, U.S. Appl. No. 14/470,896, dated Feb. 25, 2016.
U.S. Notice of Allowance, U.S. Appl. No. 14/470,896, dated May 16, 2016.
U.S. Notice of Allowance, U.S. Appl. No. 14/470,906, dated Feb. 19, 2016.
U.S. Notice of Allowance, U.S. Appl. No. 14/470,906, dated Jun. 3, 2016.
U.S. Notice of Allowance, U.S. Appl. No. 14/470,914, dated Aug. 10, 2016.
U.S. Notice of Allowance, U.S. Appl. No. 14/470,914, dated Dec. 2, 2016.
U.S. Notice of Allowance, U.S. Appl. No. 14/470,917, dated Feb. 22, 2016.
U.S. Notice of Allowance, U.S. Appl. No. 14/470,917, dated May 23, 2016.
U.S. Notice of Allowance, U.S. Appl. No. 15/215,847, dated Jun. 14, 2017.
U.S. Notice of Allowance, U.S. Appl. No. 15/215,847, dated Mar. 10, 2017.

(56) References Cited

OTHER PUBLICATIONS

U.S. Notice of Allowance, U.S. Appl. No. 15/215,971, dated Jul. 3, 2017.
U.S. Notice of Allowance, U.S. Appl. No. 15/215,971, dated Oct. 24, 2017.
U.S. Notice of Allowance, U.S. Appl. No. 15/660,910, dated Aug. 13, 2018.
U.S. Notice of Allowance, U.S. Appl. No. 15/831,323, dated Jun. 20, 2018.
U.S. Office Action, U.S. Appl. No. 14/231,625, dated Jul. 6, 2015.
U.S. Office Action, U.S. Appl. No. 14/231,625, dated Oct. 14, 2015.
U.S. Office Action, U.S. Appl. No. 14/231,656, dated Aug. 7, 2015.
U.S. Office Action, U.S. Appl. No. 14/470,896, dated Aug. 28, 2015.

* cited by examiner

210

| Version 310 | Message Type 320 | Token Length 330 | Code 340 | Message Identifier 350 |

| Option Identifier 412 | Option Length 414 | Option Value 416 |
|---|---|---|
| Option Identifier 422 | Option Length 424 | Option Value 426 |
| Option Identifier 432 | Option Length 434 | Option Value 436 |

410 — first row
420 — second row
430 — third row

| Version: 1 | Type: 0 (CON) | Token Length: 1 | Code: 0.01 (GET) | Message ID: "0xbc90" |
|---|---|---|---|---|
| Token: "0x71" | | | | |
| Option Identifier: 3 (Uri-Host) | Option Length: 15 | Option Value: "www.example.com" | | |
| Option Identifier: 4 (Uri-Port) | Option Length: 2 | Option Value: "5683" | | |
| Option Identifier: 4 (Uri-Path) | Option Length: 7 | Option Value: "sensors" | | |
| Option Identifier: 0 (Uri-Path) | Option Length: 11 | Option Value: "temperature" | | |
| Option Identifier: 3 (Max-Age) | Option Length: 1 | Option Value: "0" | | |
| Option Identifier: 1 (Uri-Query) | Option Length: 9 | Option Value: "uid=cs110" | | |
| Option Identifier: 0 (Uri-Query) | Option Length: 7 | Option Value: "hs256=1" | | |
| Option Identifier: 0 (Uri-Query) | Option Length: 7 | Option Value: "nonce=1" | | |
| Payload Marker: 0xFF | Payload: Authentication Data 1 | | | |

| Version: 1 | Type: 2 (ACK) | Token Length: 1 | Code: 2.05 (Content) | Message ID: "0xbc90" |
|---|---|---|---|---|
| Token: "0x71" | | | | |
| Option Identifier: 14 (Max-Age) | Option Length: 1 | Option Value: "0" | | |
| Option Identifier: 1 (Uri-Query) | Option Length: 9 | Option Value: "uid=cs120" | | |
| Option Identifier: 0 (Uri-Query) | Option Length: 7 | Option Value: "hs256=1" | | |
| Option Identifier: 0 (Uri-Query) | Option Length: 7 | Option Value: "nonce=1" | | |
| Payload Marker: 0xFF | Payload: "22.5 C"; Authentication Data 2 | | | |

| Unique Identifier | Key |
|---|---|
| cs110 | Key 1 |
| cs120 | Key 2 |
| cs130 | Key 3 |
| cs140 | Key 4 |

FIGURE 7

INCREASED COMMUNICATION SECURITY

RELATED APPLICATIONS

The present application is related to U.S. patent application Ser. No. 14/231,625, filed Mar. 31, 2014, entitled "INCREASED COMMUNICATION SECURITY," naming Vishnu Sharma as the inventor. The present application is also related to U.S. patent application Ser. No. 14/231,656, filed Mar. 31, 2014, entitled "INCREASED COMMUNICATION SECURITY," naming Vishnu Sharma as the inventor. Those applications are incorporated herein by reference in their entirety and for all purposes.

BACKGROUND

The Constrained Application Protocol (CoAP) is a protocol for allowing computer systems or devices to communicate by exchanging messages. The protocol specifies certain parameters related to message format and message exchange rules. Messages sent over CoAP can be relatively small in size, and therefore, CoAP allows communication between computer systems or devices with limited processing resources and/or limited storage resources. These computer systems or devices are sometimes referred to as "constrained nodes" or "constrained devices."

To address security concerns associated with communication via CoAP messages, it has been suggested that messages sent over CoAP use Datagram Transport Layer Security (DTLS). Although DTLS can increase the security of communications, it does not provide for authentication of the sender of the CoAP message.

SUMMARY

Embodiments disclosed herein are directed to increased security for communication of Constrained Application Protocol (CoAP) messages between computer systems or devices. Authentication data may be generated and included in a CoAP message communicated from a first computer system to a second computer system. The authentication data may allow the second computer system to perform message validation for verifying the authenticity of the first computer system and/or the integrity of the CoAP message. And in one embodiment, where the CoAP message includes a nonce, security can be improved by allowing the second computer system to advantageously detect and/or act on a replay attack.

In one embodiment, a method of increasing communication security includes receiving, from a first computer system at a second computer system, a Constrained Application Protocol (CoAP) message, wherein the CoAP message includes authentication data. Message validation may be performed based on the authentication data. If the CoAP message is valid, at least one operation associated with the CoAP message may be performed.

In another embodiment, a computer-readable medium may have computer-readable program code embodied therein for causing a computer system to perform a method of increasing communication security. And in one embodiment, a system may include a processor and a memory, wherein the memory includes instructions for causing the processor to implement a method of increasing communication security.

BRIEF DESCRIPTION OF THE DRAWINGS

The present invention is illustrated by way of example, and not by way of limitation, in the figures of the accompanying drawings and in which like reference numerals refer to the same or similar elements.

FIG. 3 shows a portion associated with a header of a CoAP message in accordance with one embodiment.

FIG. 4 shows a portion associated with at least one option of a CoAP message in accordance with one embodiment.

FIG. 5A shows a CoAP message associated with a request in accordance with one embodiment.

FIG. 5B shows a CoAP message associated with a response in accordance with one embodiment.

FIG. 7 shows data associated with at least one key in accordance with one embodiment.

DETAILED DESCRIPTION OF THE INVENTION

Figure 1:
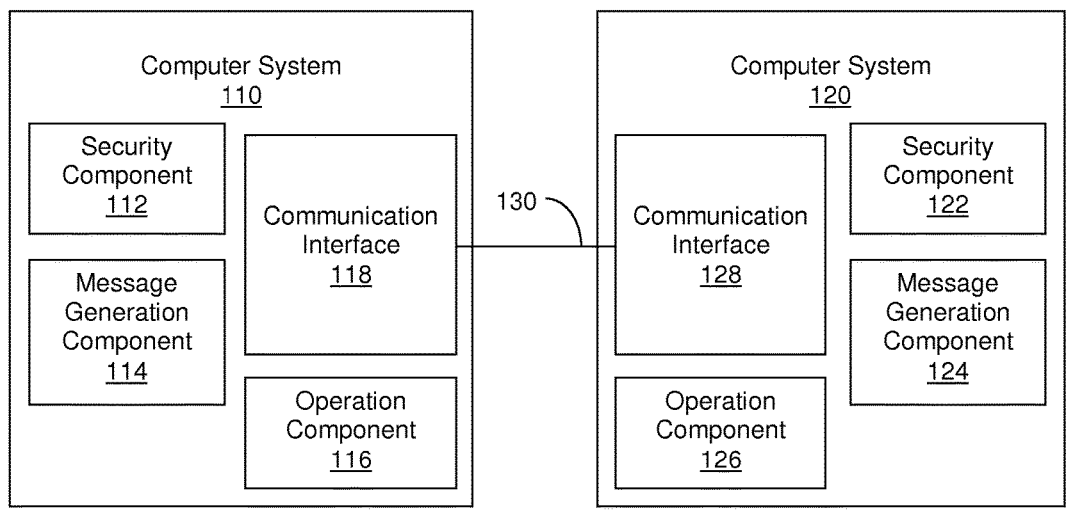
FIG. 1 shows a system for increasing communication security in accordance with one embodiment.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the art to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "activating," "adding," "adjusting," "allocating," "allowing," "analyzing," "applying," "assembling," "assigning," "authenticating," "authorizing," "balancing," "blocking," "calculating," "capturing," "causing," "changing," "charging," "combining," "comparing," "collecting," "communicating," "configuring," "controlling," "converting," "creating," "deactivating," "debugging," "decreasing," "defining," "delivering," "depicting," "detecting," "determining," "discharging," "displaying," "downloading," "enabling," "establishing," "executing," "forwarding," "flipping," "generating," "grouping," "hiding," "identifying," "ignoring," "increasing," "initiating," "instantiating," "interacting," "measuring," "modifying," "monitoring," "moving," "outputting," "parsing," "performing," "placing," "presenting," "processing," "programming," "providing," "provisioning," "querying," "receiving," "reformatting," "regulating," "removing," "rendering," "repeating," "resuming," "retaining," "sampling," "simulating," "selecting," "sending," "sorting," "storing," "subtracting," "suspending," "tracking," "transcoding," "transforming," "transmitting," "unblocking," "using," "validating," "verifying," or the like, may refer to the action and/or processes of a computer system, or similar electronic computing device, that manipulates and transforms data represented as physical (electronic) quantities within the computer system's registers and memories into other data similarly represented as physical quantities within the computer system memories or registers or other such information storage, transmission and/or display devices.

EMBODIMENTS

FIG. 1 shows system 100 for increasing communication security in accordance with one embodiment. As shown in FIG. 1, computer system 110 and computer system 120 may communicate Constrained Application Protocol (CoAP) messages over connection 130. Authentication data may be generated and included in one or more of the CoAP messages. The authentication data may allow message validation to be performed for verifying the authenticity of the sender of the CoAP message and/or the integrity of the CoAP message. And in one embodiment, where a CoAP message includes a nonce, security can be improved by allowing the recipient of the CoAP message to detect and/or act on a replay attack.

Figure 2:
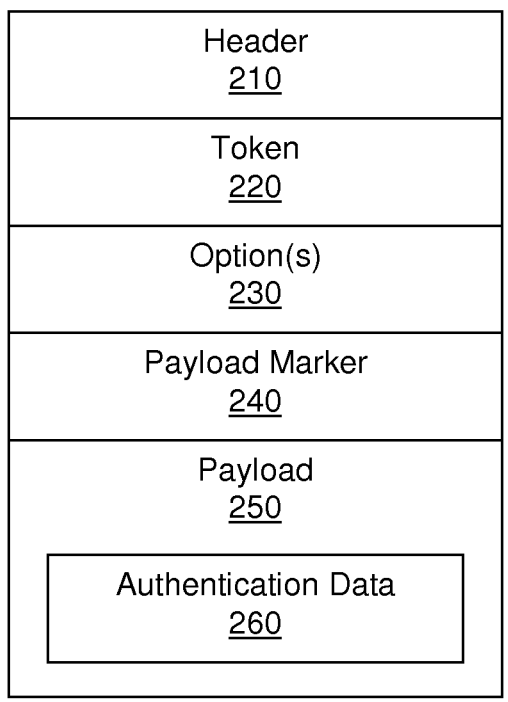
FIG. 2 shows a CoAP message in accordance with one embodiment.

FIG. 2 shows CoAP message 200 in accordance with one embodiment. CoAP message 200 may be part of a bit stream or byte stream used for communication between a plurality of systems or devices (e.g., computer system 110, computer system 120, etc.). The term "CoAP message" as used herein may refer to data which is formatted and/or communicated in accordance with CoAP.

As shown in FIG. 2, CoAP message 200 may include portion 210 associated with a header, portion 220 associated with a token, portion 230 associated with at least one option, portion 240 associated with a payload marker, and portion 250 associated with a payload, or some combination thereof. Authentication data 260 may be included in portion 250 in one embodiment.

Portion 210 may include one or more sub-portions of data. For example, as shown in FIG. 3, portion 210 may include portion 310 associated with a version, portion 320 associated with a message type, portion 330 associated with a token length, portion 340 associated with a code, portion 350 associated with a message identifier, some combination thereof, etc.

Portion 310 may be data associated with a CoAP version number. In one embodiment, portion 310 may be two bits in length. And in other embodiments, portion 310 may be larger or smaller than two bits in length.

As shown in FIG. 3, portion 320 may be data associated with a message type of CoAP message 200. For example, the message type associated with portion 320 may be confirmable, non-confirmable, acknowledgement, reset, etc.

In one embodiment, portion 320 may be two bits in length. And in other embodiments, portion 320 may be larger or smaller than two bits in length.

Portion 330 may be data associated with a length of a token (e.g., the length of portion 220 of FIG. 2) of CoAP message 200. In one embodiment, portion 330 may be four bits in length. And in other embodiments, portion 330 may be larger or smaller than four bits in length.

As shown in FIG. 3, portion 340 may be data associated with a code. In one embodiment, the code associated with portion 340 may be a method code. For example, the code associated with portion 340 may be "GET," "POST," "PUT," "DELETE," etc. In one embodiment, the code associated with portion 340 may be a response code. For example, the code associated with portion 340 may be "Created," "Deleted," "Valid," "Changed," "Content," "Bad Request," "Unauthorized," "Bad Option," "Forbidden," "Not Found," etc.

In one embodiment, portion 340 may be eight bits in length. And in other embodiments, portion 340 may be larger or smaller than eight bits in length.

Portion 350 may be data associated with a message identifier. The message identifier associated with portion 350 may be used to match or group CoAP messages based on message type (e.g., to match or group a confirmable or non-confirmable CoAP message with an acknowledgement or reset CoAP message) in one embodiment. For example, a confirmable or non-confirmable CoAP message may be matched or grouped with an acknowledgement or reset CoAP message.

In one embodiment, the message identifier associated with portion 350 may be used (e.g., in conjunction with a nonce) to distinguish a properly re-sent message (e.g., with a different nonce than a previous message with the same message identifier) from a replay attack (e.g., resulting from the sending of a message with the same nonce and the same message identifier).

In one embodiment, portion 350 may be 16 bits in length. And in other embodiments, portion 350 may be larger or smaller than 16 bits in length.

Although FIG. 3 shows portion 210 with a specific number and type of portions, it should be appreciated that portion 210 may include a different number and/or type of portions in other embodiments. For example, portion 210 may include fewer portions or at least one additional portion. As another example, a plurality of portions of portion 210 may be combined into a smaller number of portions. Although FIG. 3 shows portion 210 with a specific organization of portions, it should be appreciated that portion 210 may include a different organization of portions in other embodiments.

Turning back to FIG. 2, portion 220 may be associated with a token. The token associated with portion 220 may be used to match or group at least one request (e.g., one or more CoAP messages) to at least one response (e.g., one or more other CoAP messages) in one embodiment.

In one embodiment, portion 220 may be at most eight bits in length. The length of portion 220 may be associated with and/or dictated by portion 330 in one embodiment. And in other embodiments, portion 220 may be larger than eight bits in length.

As shown in FIG. 2, portion 230 may be associated with at least one option. The at least one option associated with portion 230 may include a unique identifier in one embodiment. For example, the at least one option associated with portion 230 may include a unique identifier associated with a sender of a CoAP message (e.g., computer system 110, computer system 120, etc.). In one embodiment, the unique identifier may be included in portion 230 as an option associated with a query (e.g., a "Uri-Query" option).

In one embodiment, the at least one option associated with portion 230 may include an authentication mechanism identifier. The term "authentication mechanism identifier" as used herein may be any data or metadata that identifies or is otherwise associated with an authentication mechanism.

For example, the at least one option associated with portion 230 may include an authentication mechanism identifier associated with an authentication mechanism used to generate authentication data 260. In one embodiment, the authentication mechanism identifier may be included in portion 230 as an option associated with a query (e.g., a "Uri-Query" option).

The at least one option associated with portion 230 may include a nonce in one embodiment. The nonce may be a random number, a pseudorandom number, a sequential or incremental number (e.g., a number with a predetermined offset from the nonce of a previously-transmitted CoAP message), a timestamp, etc. In one embodiment, the nonce may be included in portion 230 as an option associated with a query (e.g., a "Uri-Query" option).

In one embodiment, the at least one option associated with portion 230 may include a max-age value. For example, the max-age value may be used to indicate that the message is not to be cached by an intermediary system or device (e.g., situated between the sender of the CoAP message and the ultimate recipient of the CoAP message) such as a proxy server or other type of computer system or device.

The at least one option associated with portion 230 may include other data in one embodiment. For example, the at least one option associated with portion 230 may include data associated with a host, data associated with a port, data associated with a path, some combination thereof, etc. As another example, the at least one option associated with portion 230 may include data associated with a query (e.g., including at least one parameter). In one embodiment, each parameter of the query may be encoded in portion 230 as a respective option.

In one embodiment, portion 230 may include one or more respective sub-portions of data associated with each option of the at least one option. For example, as shown in FIG. 4, for each option of the at least one option (e.g., 410, 420, 430, etc.), portion 230 may include a respective portion associated with an option identifier (e.g., 412, 422, 432, etc.), a respective portion associated with an option length (e.g., 414, 424, 434, etc.), a respective portion associated with an option value (e.g., 416, 426, 436, etc.), etc.

A portion associated with an option identifier (e.g., 412, 422, 432, etc.) may include data associated with an option number corresponding to an option associated with the portion (e.g., option 410, option 420, option 430, etc.). For example, where option 410 is associated with a port (e.g., a "Uri-Port" option), portion 412 may include data associated with a numerical value of "7" (e.g., where "7" is the option number corresponding to an option associated with a port) as the option identifier. As another example, where option 420 is associated with a path (e.g., a "Uri-Path" option), portion 422 may include data associated with a numerical value of "11" (e.g., where "11" is the option number corresponding to an option associated with a path) as the option identifier. And as yet another example, where option 430 is associated with a query (e.g., a "Uri-Query" option), portion 432 may include data associated with a numerical value of "15" (e.g., where "15" is the option number corresponding to an option associated with a query) as the option identifier.

In one embodiment, a portion associated with an option identifier (e.g., 412, 422, 432, etc.) may include data associated with an option delta corresponding to an option associated with the portion (e.g., option 410, option 420, option 430, etc.). An option delta may be the difference between the current option number and the option number of the preceding option in one embodiment. For the first option, a numerical value of "0" may be used for the option number of the preceding option. A delta of "0" may be used for subsequent instances of the same option.

For example, where portion 412 is associated with an option number corresponding to "7" and option 410 is the first option, then portion 412 may include data associated with a numerical value of "7" (e.g., the delta or difference between "0" and "7") as the option identifier. As another example, where portion 412 is associated with an option number corresponding to "7" and portion 422 is associated with an option number corresponding to "11," then portion 422 may include data associated with a numerical value of "4" (e.g., the delta or difference between "7" and "11") as the option identifier. As yet another example, where portion 422 is associated with an option number corresponding to "11" and portion 432 is associated with an option number corresponding to "15," then portion 432 may include data associated with a numerical value of "4" (e.g., the delta or difference between "11" and "15") as the option identifier.

A portion associated with an option length (e.g., 414, 424, 434, etc.) may include a length of a corresponding portion associated with an option value (e.g., 416, 426, 436, etc.). For example, where portion 416 includes data associated with a port of "5683," portion 414 may include data associated with a length of two bytes (e.g., where two bytes are used to encode a numerical value of "5683"). As another example, where portion 426 includes data associated with a path of "temperature," portion 424 may include data associated with a length of 11 bytes (e.g., where 11 bytes are used to encode the path of "temperature"). As yet another example, where portion 436 includes data associated with a unique identifier of "uid=cs110," portion 434 may include data associated with a length of 9 bytes (e.g., where 9 bytes are used to encode the unique identifier of "uid=cs110").

Although FIG. 4 shows at least one option 230 with a specific number and type of portions, it should be appreciated that at least one option 230 may include a different number and/or type of portions in other embodiments. For example, at least one option 230 may include fewer portions (e.g., a smaller number of options, a smaller number of respective sub-portions associated with each option, etc.) or at least one additional portion (e.g., a larger number of options, a larger number of respective sub-portions associated with each option, etc.). As another example, a plurality of portions of at least one option 230 may be combined into a smaller number of portions. Although FIG. 4 shows at least one option 230 with a specific organization of portions, it should be appreciated that at least one option 230 may include a different organization of portions in other embodiments.

Turning back to FIG. 2, portion 240 may be associated with a payload marker. Portion 240 may be included in CoAP message 200 if portion 250 (e.g., associated with a payload) is included in CoAP message 200.

Portion 250 may be associated with a payload. In one embodiment, portion 250 may include only authentication data 260. In this case, the payload associated with portion 250 may include only authentication data 260 and no other data, content, etc. Alternatively, portion 250 may include data and/or content in addition to authentication data 260. In this case, authentication data 260 may be included in the last portion of portion 250 (e.g., with other data and/or content of the payload preceding authentication data 260), the first portion of portion 250 (e.g., with other data and/or content of the payload following authentication data 260), an intermediary portion of portion 250 (e.g., with other data and/or content of the payload both preceding and following authentication data 260), etc.

In one embodiment, CoAP message 200 may be associated with a request sent from at least one computer system to at least one other computer system. In this case, CoAP message 200 may include data associated with a request for the at least one recipient to perform at least one operation.

Alternatively, CoAP message 200 may be associated with a response sent from at least one computer system to at least one other computer system. In this case, CoAP message 200 may include data and/or content associated with a corresponding request (e.g., of a previously-communicated CoAP message). For example, CoAP message 200 may include data and/or content accessed as a result of performing at least one operation requested via a previously-communicated CoAP message.

A first CoAP message (e.g., associated with a request) and a second CoAP message (e.g., associated with a response to the request of the first CoAP message) may share a common message identifier (e.g., associated with data of portion 350 of FIG. 3) in one embodiment. A first CoAP message (e.g., associated with a request) and a second CoAP message (e.g., associated with a response to the request of the first CoAP message) may share a common token (e.g., associated with data of portion 220 of FIG. 2) in one embodiment.

In one embodiment, where a first CoAP message is associated with a request and a second CoAP message is associated with a response to the request (e.g., of the first CoAP message), a message type (e.g., associated with data of portion 320 as shown in FIG. 3) associated with the second CoAP message may correspond to and/or be determined by a message type (e.g., associated with data of portion 320 as shown in FIG. 3) associated with the first CoAP message. For example, where the first CoAP message is associated with a message type of "confirmable," the second CoAP message may be associated with a message type of "confirmable" or "acknowledgement."

In one embodiment, where a first CoAP message is associated with a request and a second CoAP message is associated with a response to the request (e.g., of the first CoAP message), a response code (e.g., associated with data of portion 340 as shown in FIG. 3) associated with the second CoAP message may correspond to and/or be determined by a method code (e.g., associated with data of portion 340 as shown in FIG. 3) associated with the first CoAP message. For example, where the first CoAP message is associated with a method code of "GET," the second CoAP message may be associated with a response code of "Content" (e.g., including the data and/or content requested using the first CoAP message).

FIG. 5A shows CoAP message 500A associated with a request in accordance with one embodiment. As shown in FIG. 5A, CoAP message 500A may include data associated with a header, where the data associated with the header includes data associated with a version (e.g., "1"), a message type (e.g., "CON" or confirmable), a token length (e.g., "1" associated with a length of 1 byte), a code (e.g., a method code of "GET"), and a message identifier (e.g., "0xbc90"). Data associated with a token (e.g., "0x71") may also be included in CoAP message 500A.

CoAP message 500A may include data associated with at least one option. For example, CoAP message 500A may include data associated with a host (e.g., an option value of "www.example.com"), data associated with a port (e.g., an option value of "5683"), data associated with a path (e.g., an option value of "sensors," an option value of "temperature," etc.), some combination thereof, etc. In this case, at least one option associated with CoAP message 500A may correspond to a URI of "coap://www.example.com:5683/sensors/temperature", "coap://www.example.com/sensors/temperature", "coaps://www.example.com:5683/sensors/temperature", "coaps://www.example.com/sensors/temperature", some combination thereof, etc.

As another example, CoAP message 500A may include data associated with a max-age value (e.g., an option value of "0"). In this case, a max-age value of "0" may be used to indicate that CoAP message 500A is not to be cached by an intermediary system or device (e.g., situated between the sender of the CoAP message 500A and the ultimate recipient of the CoAP message 500A) such as a proxy server or other type of computer system or device.

As a further example, CoAP message 500A may include data associated with a query (e.g., including one or more parameters). An option value of "uid=cs110" (e.g., associated with a first parameter) may be associated with a unique identifier (e.g., "cs110") of a sender of CoAP message 500A (e.g., computer system 110). An option value of "hs256=1" (e.g., associated with a second parameter) may be associated with an authentication mechanism (e.g., hash-based message authentication code (HMAC) utilizing a hash function of SHA256) used to generate the authentication data (e.g., "Authentication Data 1") included in CoAP message 500A. An option value of "nonce=1" (e.g., associated with a third parameter) may be associated with a nonce (e.g., with a value of "1") included in CoAP message 500A.

In one embodiment, one or more portions of CoAP message 500A may be associated with a URI including at least one parameter of a query. For example, CoAP message 500A may be associated with a URI of "coap://www.example.com:5683/sensors/temperature?uid=cs110&hs256=1 &nonce=1" or "coaps://www.example.com:5683/sensors/temperature?uid=cs110&hs256=1 &nonce=1".

CoAP message 500A may include data associated with at least one option length. For example, CoAP message 500A may include data associated with a first option length (e.g., 15 bytes) corresponding to data associated with a first option value (e.g., "www.example.com"), a second option length (e.g., 2 bytes) corresponding to data associated with a second option value (e.g., "5683"), a third option length (e.g., 7 bytes) corresponding to data associated with a third option value (e.g., "sensors"), etc.

As shown in FIG. 5A, CoAP message 500A may include data associated with at least one option identifier. The at least one option identifier may include data associated with an option number and/or an option delta in one embodiment. For example, CoAP message 500A may include data associated with a first numerical value (e.g., "3") as a first option identifier corresponding to a first option (e.g., associated with a host), where the first numerical value (e.g., "3") may be the delta or difference between the current option number (e.g., "3") and the option number of the preceding option (e.g., "0" in this case since this is the first option). As such, the first numerical value of "3" may correspond to an option number of "3."

As another example, CoAP message 500A may include data associated with a second numerical value (e.g., "4") as a second option identifier corresponding to a second option (e.g., associated with a port), where the second numerical value (e.g., "4") may be the delta or difference between the current option number (e.g., "7") and the option number of the preceding option (e.g., "3"). As such, the second numerical value of "4" may correspond to an option number of "7."

As a further example, CoAP message 500A may include data associated with a third numerical value (e.g., "4") as a third option identifier corresponding to a third option (e.g., associated with a path), where the third numerical value (e.g., "4") may be the delta or difference between the current option number (e.g., "11") and the option number of the preceding option (e.g., "7"). As such, the third numerical value of "4" may correspond to an option number of "11."

As shown in FIG. 5A, CoAP message 500A may include data associated with a payload marker (e.g., "0xFF"). CoAP message 500A may include data associated with a payload, where the data associated with a payload may include authentication data (e.g., "Authentication Data 1").

Although FIG. 5A shows CoAP message 500A with a specific number and type of portions, it should be appreciated that CoAP message 500A may include a different number and/or type of portions in other embodiments. For example, CoAP message 500A may include fewer portions or at least one additional portion. As another example, a plurality of portions of CoAP message 500A may be combined into a smaller number of portions. Although FIG. 5A shows CoAP message 500A with a specific organization of portions, it should be appreciated that CoAP message 500A may include a different organization of portions in other embodiments.

In one embodiment, data associated with at least one option may be excluded from CoAP message 500A. For example, data (e.g., associated with a host, a port, a path, a max-age value, or some combination thereof) used by intermediary systems or devices (e.g., situated between the sender of CoAP message 500A and the ultimate recipient of CoAP message 500A) such as a proxy server or other type of computer system or device may be excluded in one or more embodiments where intermediary systems or devices do not exist or are unlikely to exist.

FIG. 5B shows CoAP message 500B associated with a response in accordance with one embodiment. As shown in FIG. 5B, CoAP message 500B may include data associated with a header, where the data associated with the header includes data associated with a version (e.g., "1"), a message type (e.g., "ACK" or acknowledgement), a token length (e.g., "1" associated with a length of 1 byte), a code (e.g., a response code of "Content"), and a message identifier (e.g., "0xbc90"). Data associated with a token (e.g., "0x71") may also be included in CoAP message 500B.

CoAP message 500B may include data associated with at least one option. For example, CoAP message 500B may include data associated with a max-age value (e.g., an option value of "0"). In this case, a max-age value of "0" may be used to indicate that CoAP message 500B is not to be cached by an intermediary system or device (e.g., situated between the sender of the CoAP message 500B and the ultimate recipient of the CoAP message 500B) such as a proxy server or other type of computer system or device.

As another example, CoAP message 500B may include data associated with a query (e.g., including one or more parameters). An option value of "uid=cs120" (e.g., associated with a first parameter) may be associated with a unique identifier (e.g., "cs120") of a sender of CoAP message 500B (e.g., computer system 120). An option value of "hs256=1" (e.g., associated with a second parameter) may be associated with an authentication mechanism (e.g., hash-based message authentication code (HMAC) utilizing a hash function of SHA256) used to generate the authentication data (e.g., "Authentication Data 2") included in CoAP message 500B. An option value of "nonce=1" (e.g., associated with a third parameter) may be associated with a nonce (e.g., with a value of "1") included in CoAP message 500B.

CoAP message 500B may include data associated with at least one option length. For example, CoAP message 500B may include data associated with a first option length (e.g., 1 byte) corresponding to data associated with a first option value (e.g., "0"), a second option length (e.g., 9 bytes) corresponding to data associated with a second option value (e.g., "uid=cs120"), a third option length (e.g., 7 bytes) corresponding to data associated with a third option value (e.g., "hs256=1"), etc.

As shown in FIG. 5B, CoAP message 500B may include data associated with at least one option identifier. The at least one option identifier may include data associated with an option number and/or an option delta in one embodiment. For example, CoAP message 500B may include data associated with a first numerical value (e.g., "14") as a first option identifier corresponding to a first option (e.g., associated with a max-age value), where the first numerical value (e.g., "14") may be the delta or difference between the current option number (e.g., "14") and the option number of the preceding option (e.g., "0" in this case since this is the first option). As such, the first numerical value of "14" may correspond to an option number of "14."

As another example, CoAP message 500B may include data associated with a second numerical value (e.g., "1") as a second option identifier corresponding to a second option (e.g., associated with a query), where the second numerical value (e.g., "1") may be the delta or difference between the current option number (e.g., "15") and the option number of the preceding option (e.g., "14"). As such, the second numerical value of "1" may correspond to an option number of "15."

As a further example, CoAP message 500B may include data associated with a third numerical value (e.g., "0") as a third option identifier corresponding to a third option (e.g., associated with a query), where the third numerical value (e.g., "0") may be the delta or difference between the current option number (e.g., "15") and the option number of the preceding option (e.g., "15"). As such, the third numerical value of "0" may correspond to an option number of "15."

As shown in FIG. 5B, CoAP message 500B may include data associated with a payload marker (e.g., "0xFF"). CoAP message 500B may include data associated with a payload, where the data associated with a payload may include authentication data (e.g., "Authentication Data 2") and/or other data or content (e.g., "22.5 C.").

In one embodiment, CoAP message 500A (e.g., associated with a request) and CoAP message 500B (e.g., associated with a response to the request) may share a common message identifier (e.g., "0xbc90"). CoAP message 500A (e.g., associated with a request) and CoAP message 500B (e.g., associated with a response to the request) may share a common token (e.g., "0x71") in one embodiment.

In one embodiment, a message type associated with CoAP message 500B (e.g., "ACK" or acknowledgement) may correspond to and/or be determined by a message type associated with CoAP message 500A (e.g., "CON" or confirmable). And in one embodiment, a response code associated with CoAP message 500B (e.g., "Content") may correspond to and/or be determined by a method code associated with CoAP message 500A (e.g., "GET"). In this case, CoAP message 500B may include the data or content requested using CoAP message 500A (e.g., the temperature of "22.5 C.").

Although FIG. 5B shows CoAP message 500B with a specific number and type of portions, it should be appreciated that CoAP message 500B may include a different number and/or type of portions in other embodiments. For example, CoAP message 500B may include fewer portions or at least one additional portion. As another example, a plurality of portions of CoAP message 500B may be combined into a smaller number of portions. Although FIG. 5B shows CoAP message 500B with a specific organization of portions, it should be appreciated that CoAP message 500B may include a different organization of portions in other embodiments.

In one embodiment, data associated with at least one option may be excluded from CoAP message 500B. For example, data (e.g., associated with a host, a port, a path, a max-age value, or some combination thereof) used by intermediary systems or devices (e.g., situated between the sender of CoAP message 500B and the ultimate recipient of CoAP message 500B) such as a proxy server or other type of computer system or device may be excluded in one or more embodiments where intermediary systems or devices do not exist or are unlikely to exist.

Although FIG. 2 shows CoAP message 200 with a specific number and type of portions, it should be appreciated that CoAP message 200 may include a different number and/or type of portions in other embodiments. For example, CoAP message 200 may include fewer portions or at least one additional portion. As another example, a plurality of portions of CoAP message 200 may be combined into a smaller number of portions. Although FIG. 2 shows CoAP message 200 with a specific organization of portions, it should be appreciated that CoAP message 200 may include a different organization of portions in other embodiments. For example, authentication data 260 may be included in at least one portion of CoAP message 200 other than portion 250.

Turning back to FIG. 1, computer system 110 and computer system 120 may each include a respective security component (e.g., 112 and 122) configured to generate authentication data (e.g., to be included in one or more CoAP messages to be communicated) and/or perform message validation (e.g., with respect to at least one received CoAP message and/or with respect to authentication data included in at least one received CoAP message). A message generation component (e.g., message generation component 114 of computer system 110, message generation component 124 of computer system 120, etc.) may generate CoAP messages (e.g., including authentication data generated by security component 112, security component 122, etc.) to be communicated.

In one embodiment, a CoAP message (e.g., 200, 500A, 500B, etc.) may be generated (e.g., using message generation component 114, message generation component 124, etc.) based on a uniform resource identifier (URI). As an example, the URI may be formatted as follows:

coap://[host or IP address]:[port number]/[path]?[query]

One or more portions of the URI (e.g., the host or IP address, the port number, the path, etc.) may each be included in the CoAP message as a respective option (e.g., associated with data of portion 230 as shown in FIG. 2). For example, the host or IP address may be included as a Uri-Host option, the port number as a Uri-Port option, the path as at least one Uri-Path option, etc. The query of the URI may include at least one parameter, where each parameter of the query may be included in the CoAP message (e.g., 200, 500A, 500B, etc.) as a respective option (e.g., associated with data of portion 230 as shown in FIG. 2). For example, each parameter may be included in the CoAP message as a respective Uri-Query option.

The CoAP message (e.g., 200, 500A, 500B, etc.) including authentication data (e.g., 260, "Authentication Data 1," "Authentication Data 2," etc.) may be communicated using Datagram Transport Layer Security (DTLS) in one embodiment. In this case, the CoAP message (e.g., 200, 500A, 500B, etc.) may be generated (e.g., using message generation component 114, message generation component 124, etc.) based on a URI that begins with "coaps://."

Computer system 110 and computer system 120 may each include a respective operation component (e.g., 116 and 126) in one embodiment. An operation component (e.g., 116, 126, etc.) may be configured to perform at least one operation if a received CoAP message is determined to be valid (e.g., based on message validation performed using security component 112, security component 122, etc.).

In one embodiment, the at least one operation may include at least one operation associated with a method code (e.g., associated with data of portion 340 as shown in FIG. 3) in the CoAP message (e.g., 200, 500A, 500B, etc.) and/or at least one operation associated with an option (e.g., associated with data of portion 230 as shown in FIG. 2) of the CoAP message (e.g., 200, 500A, 500B, etc.). For example, where a CoAP message (e.g., 500A) is associated with a request to get a temperature (e.g., with a method code of "GET" and a Uri-Path option of "temperature" as depicted in FIG. 5A), the at least one operation (e.g., performed by operation component 116 of computer system 110, operation component 126 of computer system 120, etc.) may include accessing a temperature (e.g., reading a temperature, accessing a stored temperature, etc.). In this case, the operation component (e.g., 116, 126, etc.) may include a temperature sensor.

The at least one operation may include communication of a second CoAP message (e.g., 500B) in one embodiment. For example, responsive to determining that a first CoAP message (e.g., 200, 500A, etc.) is valid, the second CoAP message may be communicated from the recipient of the first CoAP message to the sender of the first CoAP message.

In one embodiment, the at least one operation may include an operation associated with a request code (e.g., associated with data of portion 340 as shown in FIG. 3) of the CoAP message (e.g., 200, 500A, 500B, etc.). For example, where a CoAP message (e.g., 500B) is associated with a response including data and/or content (e.g., with a response code of "Content" and a payload including data associated with a temperature as depicted in FIG. 5B), the at least one operation (e.g., performed by operation component 116 of computer system 110, operation component 126 of computer system 120, etc.) may include processing of the data (e.g., to generate business intelligence, for charting, for analytics, etc.), performing one or more other operations, etc.

If a received CoAP message is determined to be invalid (e.g., based on message validation performed using security component 112, security component 122, etc.), an operation component (e.g., 116 and 126) of computer systems 110 and 120 may be configured to perform at least one other operation. For example, the at least one other operation may include ignoring the received CoAP message (e.g., not sending a reply to the received CoAP message, performing no further processing related to the received CoAP message, etc.). As another example, the at least one other operation may include limiting access to the recipient (e.g., to computer system 110 where the CoAP message is received at computer system 110, to computer system 120 where the CoAP message is received at computer system 120, etc.) of the sender (e.g., computer system 110, computer system 120, at least one other computer system or device, etc.).

As shown in FIG. 1, connection 130 may be implemented using communication interface 118 (of computer system 110) and communication interface 128 (of computer system 120). Communication interface 118 and communication interface 128 may each include respective hardware and/or respective software allowing connection 130 to be established and allowing communication of at least one CoAP message over connection 130. Communication interface 118 and communication interface 128 may allow unidirectional communication and/or bidirectional communication over connection 130 in one embodiment. And in one embodiment, communication interface 118 and communication interface 128 may allow contemporaneous (or simultaneous) bidirectional communication (e.g. "full-duplex" communication) over connection 130.

Connection 130 between computer system 110 and computer system 120 may be a wired connection in one embodiment. For example, connection 130 may be a IEEE 1394 or FireWire® connection, PCI Express® connection, Ethernet connection, SATA connection, eSATA connection, RS-232 connection, I²C connection, etc. In one embodiment, connection 130 may be a wireless connection such as a Bluetooth® connection, Near Field Communication (NFC) connection, infrared (IR) connection, IEEE 802.XX connection, cellular connection, etc.

In one embodiment, computer system 110 and/or computer system 120 may have limited processing resources and/or limited storage resources. As an example, computer system 110 and/or computer system 120 may be "constrained nodes" or "constrained devices." In one embodiment, a "constrained device" may be a computer system or device with no larger than an 8-bit microcontroller. And in one or more other embodiments, a "constrained device" may be a computer system or device with at least one microcontroller larger or smaller than 8-bits in size.

As another example, computer system 110 and/or computer system 120 may communicate over a "constrained network" such as a 6LowPAN network. In this case, connection 130 may be used to implement and/or be part of a "constrained network."

Computer system 110 may be a client and computer system 120 may be a server in one embodiment. In this case, computer system 110 may communicate requests (e.g., CoAP message 200, CoAP message 500A, etc.) to computer system 120, and computer system 120 may communicate responses (e.g., CoAP message 200, CoAP message 500B, etc.) to computer system 110.

Alternatively, computer system 110 may be a server and computer system 120 may be a client in one embodiment. In this case, computer system 120 may communicate requests (e.g., CoAP message 200, CoAP message 500A, etc.) to computer system 110, and computer system 110 may communicate responses (e.g., CoAP message 200, CoAP message 500B, etc.) to computer system 120.

Although FIG. 1 shows system 100 with a specific number and type of systems or devices, it should be appreciated that system 100 may include a different number and/or type of systems or devices in other embodiments. For example, system 100 may include more than one instance of computer system 110 and/or computer system 120 in one or more other embodiments. Where system 100 includes more than one instance of computer system 110, each instance of computer system 110 may communicate with computer system 120 over a respective connection (e.g., similar to connection 130). Where system 100 includes more than one instance of computer system 120, each instance of computer system 120 may communicate with computer system 110 over a respective connection (e.g., similar to connection 130). As such, embodiments can increase the security associated with communication of CoAP messages between any number of systems or devices.

Accordingly, communication of CoAP messages between systems or devices in accordance with one or more embodiments can be used in one or more applications. For example, in the context of home automation, a first computer system (e.g., 110) may be used to communicate with and/or control at least one home appliance or system (e.g., a television, computer display, refrigerator, microwave, oven, door lock, security system, heating or air conditioning system, etc.). In this case, each home appliance or system may include at least one respective instance of a second computer system (e.g., 120). As another example, in the context of remote data monitoring, a first computer system (e.g., 110) may be used to remotely monitor at least one parameter (e.g., temperature, pressure, humidity, moisture, wind speed, etc.) measured by at least one sensor. In this case, each sensor may be included in (e.g., as at least a portion of an operational component 126) and/or in communication with at least one instance of a second computer system (e.g., 120). The data sent to the first computer system (e.g., 110) may be stored and collected (e.g., in a database), thereby allowing processing of the data (e.g., to generate business intelligence, for charting, for analytics, etc.).

Figure 6A:
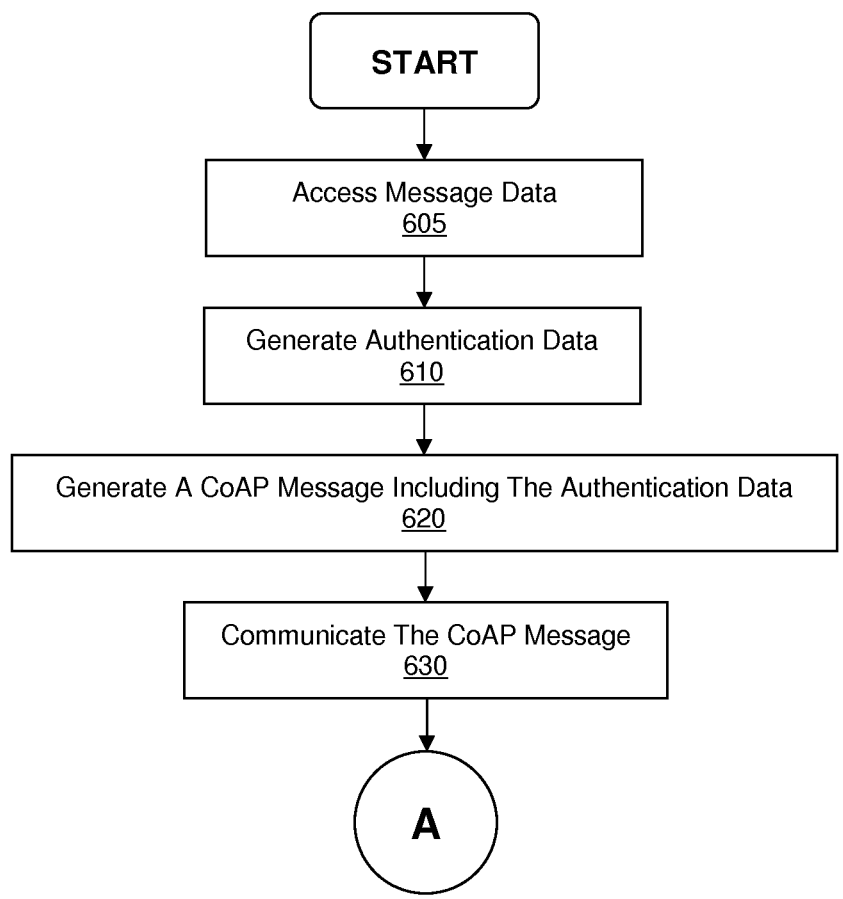
FIG. 6A shows a first portion of a flowchart of a process for increasing communication security in accordance with one embodiment.
Figure 6B:
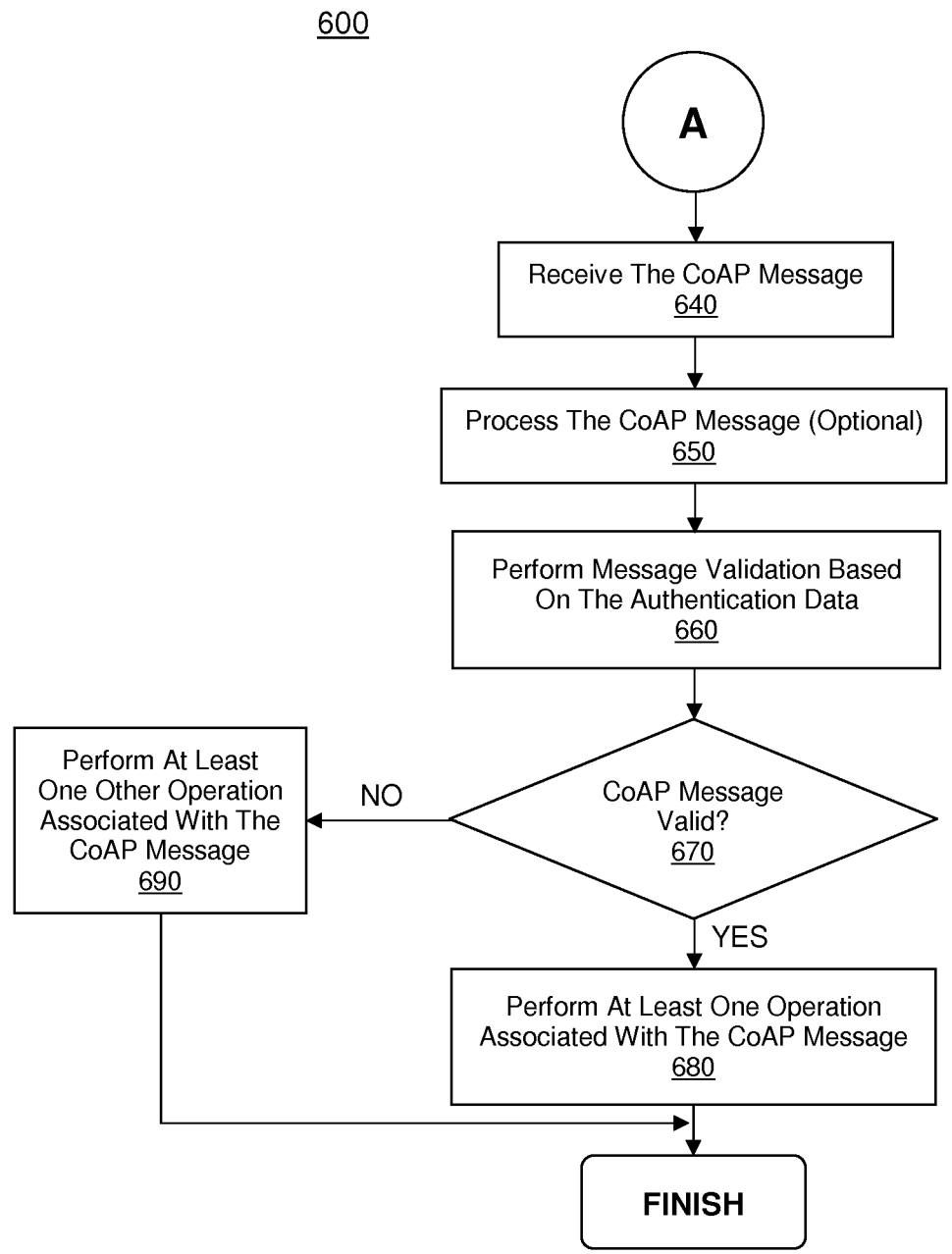
FIG. 6B shows a second portion of a flowchart of a process for increasing communication security in accordance with one embodiment.

FIGS. 6A and 6B show a flowchart of process 600 for increasing communication security in accordance with one embodiment. As shown in FIG. 6A, step 605 involves accessing message data. In one embodiment, the message data (e.g., accessed in step 605) may include at least a portion of a CoAP message (e.g., 200, 500A, 500B, etc.) other than authentication data (e.g., 260 of FIG. 2, "Authentication Data 1" of FIG. 5A, "Authentication Data 2" of FIG. 5B, etc.). For example, the message data may include data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), some combination thereof, etc. And in one embodiment, the message data (e.g., accessed in step 605) may include a unique identifier (e.g., associated with a sender of the CoAP message, included in portion 230 of CoAP message 200, etc.), an authentication mechanism identifier (e.g., associated with an authentication mechanism used to generate the authentication data included in the CoAP message, included in portion 230 of CoAP message 200, etc.), a nonce (e.g., included in portion 230 of CoAP message 200, etc.), or some combination thereof.

As shown in FIG. 6A, step 610 involves generating authentication data (e.g., 260 of FIG. 2, "Authentication Data 1" of FIG. 5A, "Authentication Data 2" of FIG. 5B, etc.). In one embodiment, the authentication data may be generated in step 610 at a computer system (e.g., by security component 112 of computer system 110, by security component 122 of computer system 120, etc.) using an authentication mechanism such as HMAC, OAuth, OAuth 2.0, OpenID, etc. And in one embodiment, the authentication data (e.g., 260 of FIG. 2, "Authentication Data 1" of FIG. 5A, "Authentication Data 2" of FIG. 5B, etc.) may be generated in step 610 based on message data (e.g., accessed in step 605).

The authentication data may be generated in step 610 based on a key in one embodiment. For example, where the authentication mechanism used to generate the authentication data in step 610 is HMAC, the authentication data may be generated by performing a hash function (e.g., MD5, SHA-1, SHA256, SHA512, etc.) on the message data (e.g., accessed in step 605) using a key. And in one embodiment, the CoAP message (e.g., 200, 500A, 500B, etc.) may be free of a key used to generate the authentication data in step 610.

In one embodiment, the key may be associated with the sender of the CoAP message (e.g., generated in step 620). For example, the key may be a secret key or private key that is unique to the sender (e.g., computer system 110, computer system 120, etc.). Alternatively, the key may be associated with the recipient of the CoAP message (e.g., generated in step 620). For example, the key may be a secret key or private key that is unique to the recipient (e.g., computer system 110, computer system 120, etc.).

Where a key associated with the sender of the CoAP message (e.g., generated in step 620) is used to generate the authentication data in step 610, the key may be stored locally at the sender in one embodiment. For example, the key may be stored locally in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the key may be stored remotely (e.g., at another system or device) and accessed by the sender in a secure manner in one embodiment. Accordingly, a key associated with the sender of the CoAP message may be accessed and used by the sender to securely generate the authentication data in step 610.

Where a key associated with the recipient of the CoAP message (e.g., generated in step 620) is used to generate the authentication data in step 610, the sender may access the key based on information about the recipient in one embodiment. For example, using data (e.g., 700 of FIG. 7) which correlates or maps information about systems or devices (e.g., unique identifiers) to keys, the sender (e.g., computer system 110) may access a key (e.g., "Key 2") associated with the recipient (e.g., computer system 120) based on information about the recipient (e.g., the unique identifier of "cs120" associated with computer system 120, other information associated with computer system 120, etc.). In one embodiment, the data (e.g., 700 of FIG. 7) may be stored locally in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the data (e.g., 700 of FIG. 7) may be stored remotely (e.g., at another system or device) and accessed by the sender in a secure manner in one embodiment. Accordingly, a key associated with the recipient of the CoAP message may be accessed and used by the sender to securely generate the authentication data in step 610.

Although FIG. 7 shows data 700 as including a particular amount of data, it should be appreciated that a different amount of data may be included in data 700 in other embodiments. Additionally, although FIG. 7 shows data 700 as including a particular arrangement and type of data, it should be appreciated that a different arrangement and/or type of data may be included in data 700 in other embodiments.

The size or length of the key (e.g., used to generate the authentication data in step 610) may be associated with the authentication mechanism used to generate the authentication data in step 610. For example, where the authentication mechanism of HMAC utilizing a SHA256 hash function is used to generate the authentication data, the length of the key may be 32 bytes. As another example, where the authentication mechanism of HMAC utilizing a SHA512 hash function is used to generate the authentication data, the length of the key may be 64 bytes.

In one embodiment, multiple CoAP messages may each include respective authentication data generated based on a key associated with a common system or device. For example, where a first CoAP message (e.g., 500A) is sent from a first computer system (e.g. 110) to a second computer system (e.g., 120), and where a second CoAP message (e.g., 500B) is sent from the second computer system (e.g., 120) to the first computer system (e.g., 110), the first CoAP message (e.g., 500A) and the second CoAP message (e.g., 500B) may each include respective authentication data (e.g., "Authentication Data 1" and "Authentication Data 2") generated based on a key associated with the first computer system (e.g., 110). It should be appreciated that the authentication data (e.g., "Authentication Data 1" and "Authentication Data 2") included in the first and second CoAP messages may be different (even though they are generated based on the same key associated with the first computer system) since the respective data or content of each CoAP message may be different.

As another example, where a first CoAP message (e.g., 500A) is sent from a first computer system (e.g. 110) to a second computer system (e.g., 120), and where a second CoAP message (e.g., 500B) is sent from the second computer system (e.g., 120) to the first computer system (e.g., 110), the first CoAP message (e.g., 500A) and the second CoAP message (e.g., 500B) may each include respective authentication data (e.g., "Authentication Data 1" and "Authentication Data 2") generated based on a key associated with the second computer system (e.g., 120). It should be appreciated that the authentication data (e.g., "Authentication Data 1" and "Authentication Data 2") included in the first and second CoAP messages may be different (even though they are generated based on the same key associated with the second computer system) since the respective data or content of each CoAP message may be different.

As shown in FIG. 6A, step 620 involves generating a CoAP message which includes the authentication data (e.g., generated in step 610). The CoAP message (e.g., 200, 500A, 500B, etc.) may be generated in step 620 using a message generation component (e.g., 114 of the computer system 110, 124 of the computer system 120, etc.) in one embodiment. And in one embodiment, step 620 may be performed in accordance with process 800 of FIG. 8.

Figure 8:
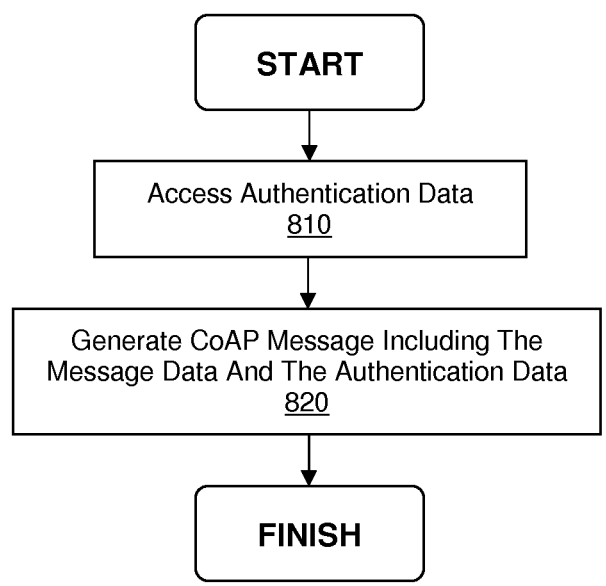
FIG. 8 shows a flowchart of a process for generating a CoAP message in accordance with one embodiment.

FIG. 8 shows a flowchart of process 800 for generating a CoAP message in accordance with one embodiment. As shown in FIG. 8, step 810 involves accessing authentication data (e.g., 260, "Authentication Data 1" of CoAP message 500A, "Authentication Data 2" of CoAP message 500B, etc.). The authentication data accessed in step 810 may be the authentication data generated in step 610 of process 600 in one embodiment.

As shown in FIG. 8, step 820 involves generating the CoAP message (e.g., 200, 500A, 500B, etc.) including message data (e.g., accessed in step 605) and the authentication data (e.g., accessed in step 810). The CoAP message (e.g., 200, 500A, 500B, etc.) may be generated in step 820 using a message generation component (e.g., 114 of computer system 110, 124 of computer system 120, etc.) in one embodiment. In one embodiment, step 820 may involve formatting the message data in accordance with CoAP (e.g., into one or more portions of CoAP message 200). The authentication data may be included in or as the payload (e.g., associated with portion 250 of CoAP message 200) of the CoAP message (e.g., 200, 500A, 500B, etc.) in one embodiment.

In one embodiment, step 820 may involve further including a payload marker as part of the CoAP message generation. For example, where the message data is free of data or content to be included as a payload (e.g., and therefore is also free of a payload marker), a payload marker may be included as part of the CoAP message in step 820 since the authentication data (e.g., accessed in step 810) may be included as the payload (e.g., the entire payload) of the CoAP message.

In one embodiment, step 820 may involve generating a bit stream or byte stream including the message data (e.g., accessed in step 605) and the authentication data (e.g., accessed in step 810). The bit stream or byte stream may be formatted in accordance with CoAP in one embodiment.

Although FIG. 8 depicts process 800 as including a specific number of steps, it should be appreciated that process 800 may include a different number of steps in other embodiments. Although FIG. 8 depicts process 800 as including a specific ordering of steps, it should be appreciated that process 800 may include a different ordering of steps in other embodiments.

Turning back to FIG. 6A, step 630 involves communicating the CoAP message (e.g., generated in step 620 and/or in accordance with one or more steps of process 800 of FIG. 8). In one embodiment, step 630 may involve communicating the CoAP message from a first computer system (e.g., 110) to at least one other computer system (e.g., 120, one or more other systems or devices, etc.). And in one embodiment, step 630 may involve communicating the CoAP message from a second computer system (e.g., 120) to at least one other computer system (e.g., 110, one or more other systems or devices, etc.).

In one embodiment, the CoAP message may be communicated in step 630 over a connection (e.g., 130 between computer system 110 and computer system 120). The CoAP message may be communicated in step 630 as a bit stream or a byte stream in one embodiment. And in one embodiment, step 630 may involve communicating the CoAP message using a communication interface (e.g., 118 of computer system 110, 128 of computer system 120, etc.).

Accordingly, communication security can be increased by including authentication data in CoAP messages communicated between systems or devices. For example, the recipient of the CoAP message (e.g., 200, 500A, 500B, etc.) can perform message validation with respect to the authentication data (e.g., included in the CoAP message) to verify the authenticity of the sender of the CoAP message and/or the integrity of the CoAP message. As another example, where the CoAP message (e.g., 200, 500A, 500B, etc.) includes a nonce (e.g., in the data associated with portion 230, in another portion of the CoAP message, etc.), communication security can be improved by allowing the recipient to detect and/or act on a replay attack.

As shown in FIG. 6B, step 640 involves receiving the CoAP message (e.g., 200, 500A, 500B, etc.). In one embodiment, step 640 may involve receiving the CoAP message at the second computer system (e.g., 120) from another computer system (e.g., 110, another system or device, etc.). And in one embodiment, step 640 may involve receiving the CoAP message at the first computer system (e.g., 110) from another computer system (e.g., 120, another system or device, etc.).

In one embodiment, the CoAP message may be received in step 640 over a connection (e.g., 130 between computer system 110 and computer system 120). The CoAP message may be received in step 640 as a bit stream or a byte stream in one embodiment. And in one embodiment, step 640 may involve receiving the CoAP message using a communication interface (e.g., 118 of computer system 110, 128 of computer system 120, etc.).

Step 650 involves optionally processing the CoAP message (e.g., received in step 640). In one embodiment, step 650 may involve processing the CoAP message using a security component (e.g., 112 of computer system 110, 122 of computer system 120, etc.). And in one embodiment, step 650 may be performed in accordance with process 900 of FIG. 9.

Figure 9:
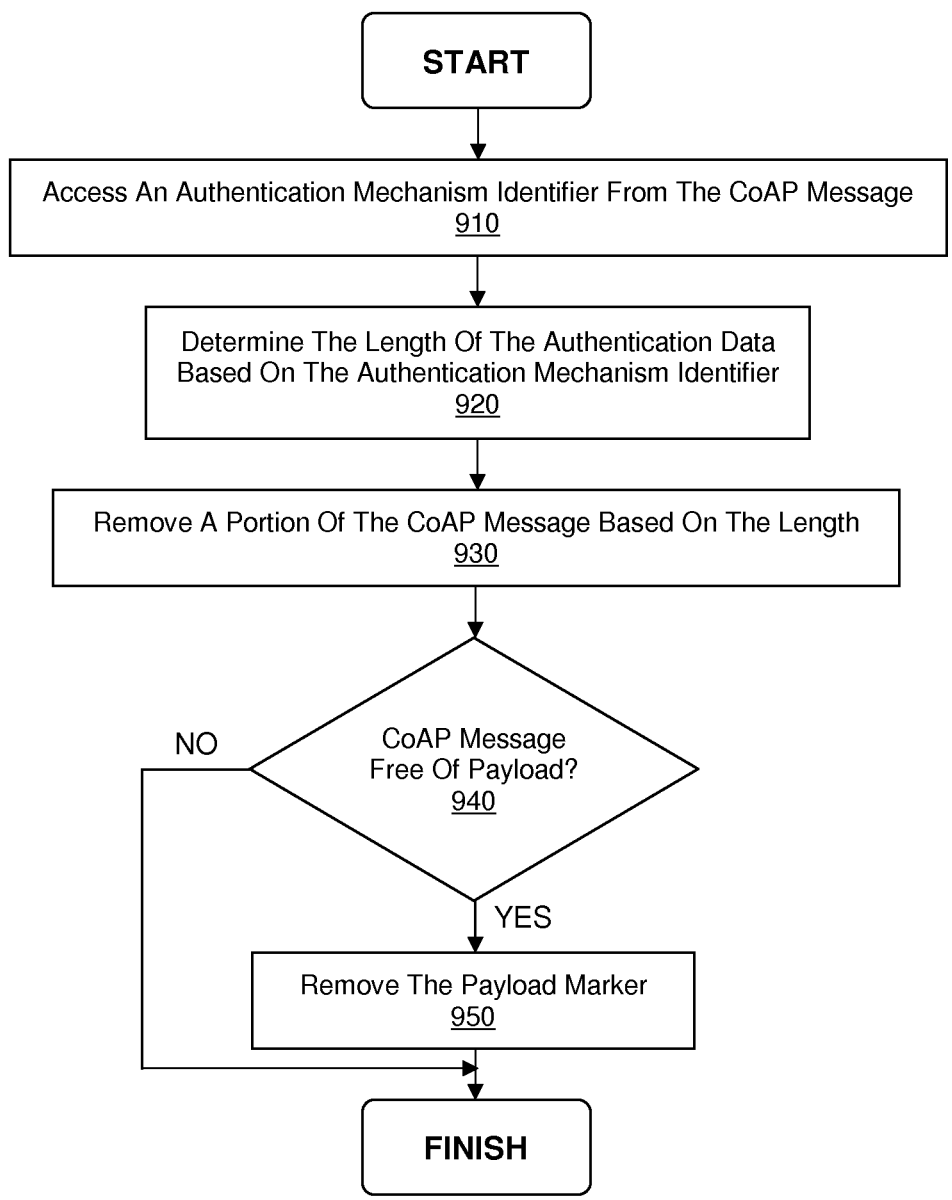
FIG. 9 shows a flowchart of a process for processing a CoAP message in accordance with one embodiment.

FIG. 9 shows a flowchart of process 900 for processing a CoAP message in accordance with one embodiment. As shown in FIG. 9, step 910 involves accessing an authentication mechanism identifier from the CoAP message (e.g., 200, 500A, 500B, etc.). The authentication mechanism identifier may be associated with the authentication mechanism (e.g., HMAC utilizing a MD5 hash function, HMAC utilizing a SHA-1 hash function, HMAC utilizing a SHA256 hash function, HMAC utilizing a SHA512 hash function, OAuth, OAuth 2.0, OpenID, etc.) used to generate the authentication data (e.g., in step 610 of process 600) in one embodiment. And in one embodiment, the authentication mechanism identifier may be accessed in step 910 from a portion of the CoAP message associated with at least one option (e.g., portion 230 of CoAP message 200). For example, an authentication mechanism identifier (e.g. "hs256=1" associated with, in this case, an authentication mechanism of HMAC utilizing a SHA256 hash function) may be accessed from a portion of CoAP message 500A associated with an option value (e.g., of an option associated with a query, of a "Uri-Query" option, etc.).

Step 920 may involve determining the length of the authentication data (e.g., 260, "Authentication Data 1" of CoAP message 500A, "Authentication Data 2" of CoAP message 500B, etc.) based on the authentication mechanism identifier (e.g., accessed in step 910). For example, where the authentication mechanism identifier (e.g. "hs256=1" of CoAP message 500A) is associated with an authentication mechanism of HMAC utilizing a SHA256 hash function, the length of the authentication data may be determined in step 920 to be 32 bytes. As another example, where the authentication mechanism identifier is associated with an authentication mechanism of HMAC utilizing a SHA512 hash function, the length of the authentication data may be determined in step 920 to be 64 bytes.

As shown in FIG. 9, step 930 involves removing a portion of the CoAP message based on the length (e.g., determined in step 920). The portion of the CoAP message removed in step 930 may include at least a portion of the authentication data (e.g., 260). In one embodiment, the portion removed in step 930 may be a predetermined portion (e.g., the first portion, the last portion, an intermediary portion, etc.) of a payload of the CoAP message. For example, where the length of the authentication data is determined to be 32 bytes in step 920, step 930 may involve removing the last 32 bytes of the CoAP message.

Step 940 involves determining whether the CoAP message is free of a payload (e.g., after removal of the portion in step 930). If it is determined in step 940 that at least a portion of the payload remains (e.g., the CoAP message is not free of the payload), then step 950 may be bypassed and process 900 may terminate. Alternatively, if it is determined in step 940 that the CoAP message is free of the payload (e.g., no other data or content remains after removal of the portion in step 930), then the payload marker (e.g., associated with portion 240 of CoAP message 200) may be removed from the CoAP message in step 950.

Accordingly, in one embodiment, the payload marker may be removed from the CoAP message where the payload of the CoAP message (e.g., received in step 640) includes only the authentication data (e.g., 260, "Authentication Data 1" of CoAP message 500A, "Authentication Data 2" of CoAP message 500B, etc.). This may be used to account for the situation where, during message generation (e.g., in step 620 and/or in accordance with one or more steps of process 800 of FIG. 8), the payload marker was included in the CoAP message since the authentication data was included as the payload (e.g., the entire payload) of the CoAP message.

Although FIG. 9 depicts process 900 as including a specific number of steps, it should be appreciated that process 900 may include a different number of steps in other embodiments. Although FIG. 9 depicts process 900 as including a specific ordering of steps, it should be appreciated that process 900 may include a different ordering of steps in other embodiments.

Turning back to FIG. 6B, step 660 involves performing message validation based on the authentication data (e.g., accessed from the CoAP message in step 650 and/or in step 930). In one embodiment, the message validation may be used to verify the authenticity of the sender of the CoAP message (e.g., 200, 500A, 500B, etc.) and/or the integrity of the CoAP message (e.g., 200, 500A, 500B, etc.). Where the CoAP message (e.g., 200, 500A, 500B, etc.) includes a nonce (e.g., in data associated with portion 230, in another portion of the CoAP message, etc.), the message validation may be used to detect a replay attack.

In one embodiment, message validation may be performed in step 660 by comparing second authentication data to the authentication data (e.g., accessed from the CoAP message in step 650 and/or in step 930). The second authentication data may be generated (e.g., in step 660) based on at least a portion of the CoAP message (e.g., received in step 640) in one embodiment. For example, the second authentication data may be generated based on data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), some combination thereof, etc. As another example, the second authentication data may be generated based on at least a unique identifier (e.g., associated with a sender of the CoAP message, included in portion 230 of CoAP message 200, etc.), an authentication mechanism identifier (e.g., associated with an authentication mechanism used to generate the authentication data included in the CoAP message and/or used to generate the second authentication data, included in portion 230 of CoAP message 200, etc.), a nonce (e.g., included in portion 230 of CoAP message 200, etc.), or some combination thereof. And as a further example, the second authentication data may be generated based on at least a portion of the CoAP message excluding the authentication data (e.g., 260 of FIG. 2, "Authentication Data 1" of FIG. 5A, "Authentication Data 2" of FIG. 5B, etc.).

The second authentication data may be generated (e.g., in step 660) based on a key in one embodiment. For example, where the authentication mechanism used to generate the second authentication data is HMAC, the second authentication data may be generated by performing a hash function (e.g., MD5, SHA-1, SHA256, SHA512, etc.) on at least a portion of the CoAP message using a key. And in one embodiment, the CoAP message (e.g., received in step 640) may be free of a key used to generate the second authentication data.

In one embodiment, the key may be associated with the sender of the CoAP message (e.g., received in step 640). For example, the key may be a secret key or private key that is unique to the sender (e.g., computer system 110, computer system 120, etc.). Alternatively, the key may be associated with the recipient of the CoAP message (e.g., received in step 640). For example, the key may be a secret key or private key that is unique to the recipient (e.g., computer system 110, computer system 120, etc.).

In one embodiment, at least one attribute of the generation of the second authentication data in step 660 may be the same as at least one attribute of the generation of the authentication data (e.g., in step 610). For example, the second authentication data may be generated based on the same data as the authentication data, the second authentication data may be generated based on the same key as the authentication data, the second authentication data may be generated using the same authentication mechanism as the authentication data, some combination thereof, etc.

The message validation may be performed in step 660 using a security component (e.g., 112 of computer system 110, 122 of computer system 120, etc.) in one embodiment. And in one embodiment, step 660 may be performed in accordance with process 1000 of FIG. 10.

Figure 10:
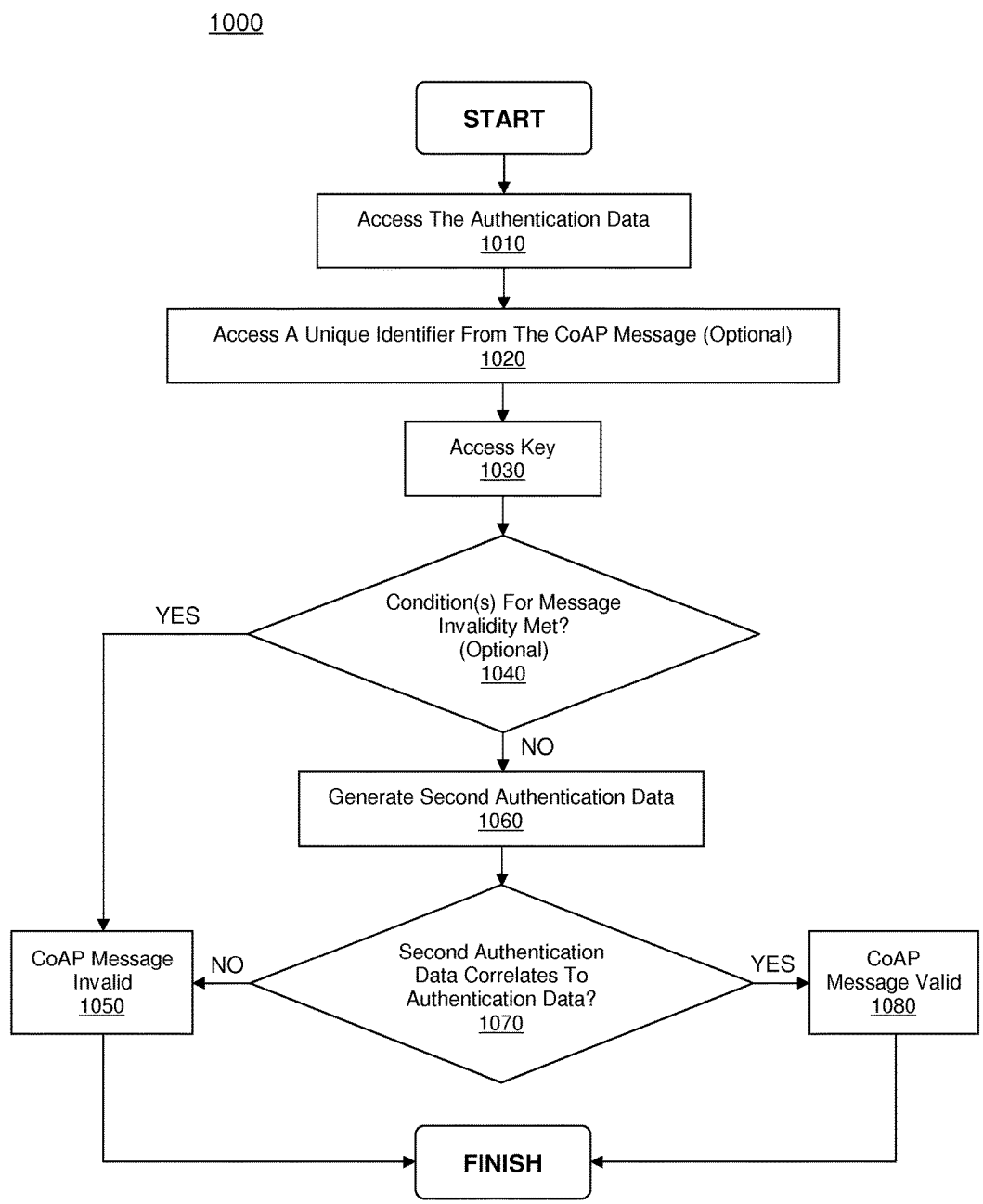
FIG. 10 shows a flowchart of a process for performing message validation in accordance with one embodiment.

FIG. 10 shows a flowchart of process 1000 for performing message validation in accordance with one embodiment. As shown in FIG. 10, step 1010 involves accessing the authentication data (e.g., 260 of FIG. 2, "Authentication Data 1" of FIG. 5A, "Authentication Data 2" of FIG. 5B, etc.). In one embodiment, the authentication data may be accessed from the CoAP message (e.g., received in step 640). And in one embodiment, the authentication data may be accessed from data associated with processing of the CoAP message (e.g., in step 650 and/or in accordance with one or more steps of process 900). For example, the authentication data may be accessed from a portion of data removed from the CoAP message (e.g., in step 930).

Step 1020 involves optionally accessing a unique identifier from the CoAP message (e.g., 200, 500A, 500B, etc.). For example, where the CoAP message includes authentication data generated using a key associated with the sender of the CoAP message, a unique identifier (e.g., associated with the sender of the CoAP message) may be accessed from the CoAP message in step 1020 by the recipient. In one embodiment, the unique identifier may be accessed in step 1020 from a portion of the CoAP message associated with at least one option (e.g., portion 230 of CoAP message 200).

As shown in FIG. 10, step 1030 involves accessing a key. The key may be stored locally at the recipient in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the key may be stored remotely (e.g., at a system or device other than the recipient) and accessed by the recipient in step 1030 in a secure manner. As such, in accordance with one or more embodiments, the key may be accessed (e.g., by the recipient) in step 1030 while limiting other access to the key (e.g., by at least one system or device other than the recipient).

The key may be associated with the sender of the CoAP message (e.g., received in step 640) in one embodiment. For example, the key may be a secret key or private key that is unique to the sender (e.g., computer system 110, computer system 120, etc.). Alternatively, the key may be associated with the recipient of the CoAP message (e.g., received in step 640). For example, the key may be a secret key or private key that is unique to the recipient (e.g., computer system 110, computer system 120, etc.).

Where the key is associated with the sender of the CoAP message, the recipient may access the key in step 1030 based on information about the sender in one embodiment. For example, the unique identifier (e.g., associated with the sender of the CoAP message) accessed in step 1020 may be used by the recipient to access the key (e.g., associated with the sender) in step 1030.

In one embodiment, the recipient may access the key (e.g., associated with the sender of the CoAP message) in step 1030 using data (e.g., 700 of FIG. 7) which correlates or maps information about systems or devices (e.g., unique identifiers) to keys. The data (e.g., 700 of FIG. 7) may be stored locally at the recipient in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the data (e.g., 700 of FIG. 7) may be stored remotely (e.g., at a system or device other than the recipient) and accessed by the recipient in a secure manner.

Where the key is associated with the recipient of the CoAP message, the key may be accessed locally by the recipient in step 1030 in one embodiment. For example, the key (e.g., associated with the recipient) may be accessed from local storage in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the key (e.g., associated with the recipient) may be accessed remotely (e.g., from another system or device) in a secure manner by the recipient in step 1030 in one embodiment.

As shown in FIG. 10, step 1040 involves determining whether at least one condition for message invalidity is met. In one embodiment, step 1040 may be performed in accordance with process 1100 of FIG. 11.

Figure 11:
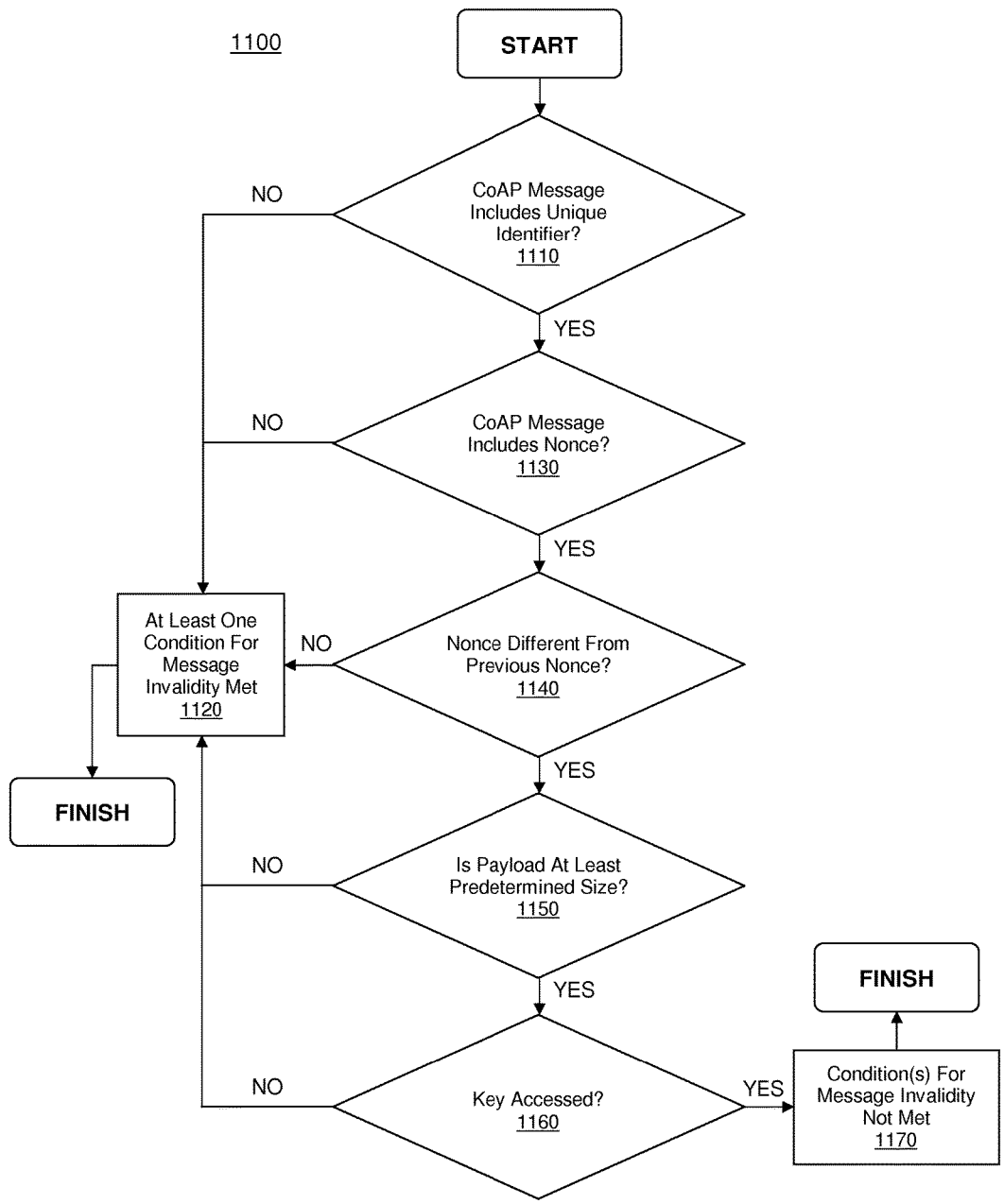
FIG. 11 shows a flowchart of a process for determining whether at least one condition for message invalidity is met in accordance with one embodiment.

FIG. 11 shows a flowchart of process 1100 for determining whether at least one condition for message invalidity is met in accordance with one embodiment. As shown in FIG. 11, step 1110 involves determining whether the CoAP message (e.g., received in step 640) includes a unique identifier. In one embodiment, step 1110 may involve determining whether the CoAP message includes a unique identifier associated with the sender (e.g., computer system 110, computer system 120, another system or device, etc.) of the CoAP message. And in one embodiment, step 1110 may involve determining whether a portion of the CoAP message associated with at least one option (e.g., portion 230 of CoAP message 200) includes a unique identifier.

If it is determined in step 1110 that the CoAP message does not include a unique identifier, then it may be determined in step 1120 that at least one condition for message invalidity has been met and process 1100 may terminate. Alternatively, if it is determined in step 1110 that the CoAP message includes a unique identifier, then step 1130 may be performed.

As shown in FIG. 11, step 1130 involves determining whether the CoAP message (e.g., received in step 640) includes a nonce. In one embodiment, step 1130 may involve determining whether a portion of the CoAP message associated with at least one option (e.g., portion 230 of CoAP message 200) includes a nonce.

If it is determined in step 1130 that the CoAP message does not include a nonce, then it may be determined in step 1120 that at least one condition for message invalidity has been met and process 1100 may terminate. Alternatively, if it is determined in step 1130 that the CoAP message includes a nonce, then step 1140 may be performed.

As shown in FIG. 11, step 1140 involves determining whether the nonce (e.g., included in the CoAP message as determined in step 1130) is different from a previous nonce (e.g., of a previously-transmitted or previously-received CoAP message). In one embodiment, the recipient of the CoAP message may store at least one previous nonce (e.g., from one or more previously-transmitted or previously-received CoAP messages) for comparison with the nonce of the CoAP message.

In one embodiment, it may be determined in step 1140 whether the nonce is different from another nonce of another CoAP message (e.g., of a previously-transmitted or previously-received CoAP message) from the same sender (e.g., corresponding to the unique identifier associated with step 1110). For example, the recipient of the CoAP message may store at least one previous nonce corresponding to the sender of the CoAP message for comparison with the nonce of the CoAP message.

In one embodiment, step 1140 may be used to increase communication security by detecting a replay attack. For example, if it is determined in step 1140 that the nonce is the same as (e.g., not different from) a previous nonce, then it may indicate a malicious re-sending of the CoAP message or that the CoAP message is otherwise associated with a replay attack.

If it is determined in step 1140 that the nonce is not different from a previous nonce, then it may be determined in step 1120 that at least one condition for message invalidity has been met and process 1100 may terminate. Alternatively, if it is determined in step 1140 that the nonce is different from a previous nonce, then step 1150 may be performed.

As shown in FIG. 11, step 1150 involves determining whether a payload of the CoAP message (e.g., received in step 640) is at least a predetermined size. In one embodiment, the predetermined size may correspond to an authentication mechanism used to generate authentication data (e.g., 260 of FIG. 2, "Authentication Data 1" of FIG. 5A, "Authentication Data 2" of FIG. 5B, etc.) included in the CoAP message and/or an authentication mechanism identifier included in the CoAP message (e.g., in a portion of the CoAP message associated with at least one option, in portion 230 of CoAP message 200, in another portion, etc.).

For example, where an authentication mechanism (e.g., used to generate the authentication data included in the CoAP message) is HMAC utilizing a SHA256 hash function and/or where an authentication mechanism identifier (e.g., included in the CoAP message) is associated with an authentication mechanism (e.g., used to generate the authentication data included in the CoAP message) of HMAC utilizing a SHA256 hash function, the predetermined size used in step 1150 may be 32 bytes. As another example, where an authentication mechanism (e.g., used to generate the authentication data included in the CoAP message) is HMAC utilizing a SHA512 hash function and/or where an authentication mechanism identifier (e.g., included in the CoAP message) is associated with an authentication mechanism (e.g., used to generate the authentication data included in the CoAP message) of HMAC utilizing a SHA512 hash function, the predetermined size used in step 1150 may be 64 bytes.

In one embodiment, step 1150 may be used to increase communication security by identifying one or more security risks related to authentication data of the CoAP message. For example, if it is determined in step 1150 that the payload of the CoAP message is not at least a predetermined size, then it may indicate that the CoAP message does not include any authentication data and/or that the authentication data is not proper (e.g., not of the proper size or length based on an authentication mechanism used to generate the authentication data).

If it is determined in step 1150 that the payload of the CoAP message is not at least a predetermined size, then it may be determined in step 1120 that at least one condition for message invalidity has been met and process 1100 may terminate. Alternatively, if it is determined in step 1150 that the payload of the CoAP message is at least a predetermined size, then step 1160 may be performed.

As shown in FIG. 11, step 1160 involves determining if a key has been accessed (e.g., in step 1030 of process 1000). In one embodiment, step 1160 may involve determining if a key associated with the recipient of the CoAP message has been accessed. And in one embodiment, step 1160 may involve determining if a key associated with the sender of the CoAP message has been accessed (e.g., based on a unique identifier or other information associated with the sender).

If it is determined in step 1160 that a key has not been accessed, then it may be determined in step 1120 that at least one condition for message invalidity has been met and process 1100 may terminate. Alternatively, if it is determined in step 1160 that a key has been accessed, then it may be determined in step 1170 that at least one condition for message invalidity has not been met and process 1100 may terminate.

Although FIG. 11 depicts process 1100 as including a specific number of steps, it should be appreciated that process 1100 may include a different number of steps in other embodiments. For example, one or more steps (e.g., step 1110, 1130, 1140, 1150, 1160, or some combination thereof) may be omitted in one or more embodiments. Although FIG. 11 depicts process 1100 as including a specific ordering of steps, it should be appreciated that process 1100 may include a different ordering of steps in other embodiments.

Turning back to FIG. 10, if it is determined in step 1040 that at least one condition for message invalidity has been met, then it may be determined in step 1050 that the CoAP message (e.g., received in step 640) is invalid. Alternatively, if it is determined in step 1040 that at least one condition for message invalidity has not been met, then step 1060 may be performed.

As shown in FIG. 10, step 1060 involves generating second authentication data. In one embodiment, the second authentication data may be generated in step 1060 using an authentication mechanism such as HMAC, OAuth, OAuth 2.0, OpenID, etc. And in one embodiment, the authentication mechanism used to generate the second authentication data in step 1060 may be the same as the authentication mechanism used to generate (e.g., in step 610) the authentication data (e.g., included in the CoAP message received in step 640).

In one embodiment, the authentication mechanism used to generate the second authentication data in step 1060 may be determined based on an authentication mechanism identifier included in the CoAP message (e.g., in portion 230 associated with at least one option). In one embodiment, the authentication mechanism used to generate the second authentication data in step 1060 may be determined based on at least one other message (e.g., including information about an authentication mechanism used to generate the authentication data and/or the second authentication data), where the at least one other message may be separate from the CoAP message (e.g., including the authentication data) and may be communicated before or after the CoAP message. And in one embodiment, the authentication mechanism used to generate the second authentication data in step 1060 may be determined using data stored at the recipient (e.g., in security component 112 of computer system 110, in another component of computer system 110, in security component 122 of computer system 120, in another component of computer system 120, in a component of another system or device, etc.), where the data may be supplied to the recipient by another system or device.

In one embodiment, the second authentication data may be generated in step 1060 based on at least a portion of the CoAP message (e.g., received in step 640). For example, the second authentication data may be generated in step 1060 based on data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), some combination thereof, etc. As another example, the second authentication data may be generated in step 1060 based on at least a unique identifier (e.g., associated with a sender of the CoAP message, included in portion 230 of CoAP message 200, etc.), an authentication mechanism identifier (e.g., associated with an authentication mechanism used to generate the authentication data included in the CoAP message and/or used to generate the second authentication data in step 1060, included in portion 230 of CoAP message 200, etc.), a nonce (e.g., included in portion 230 of CoAP message 200, etc.), or some combination thereof. And as a further example, the second authentication data may be generated in step 1060 based on at least a portion of the CoAP message excluding the authentication data (e.g., 260 of FIG. 2, "Authentication Data 1" of FIG. 5A, "Authentication Data 2" of FIG. 5B, etc.).

The second authentication data may be generated in step 1060 based on a key in one embodiment. For example, where the authentication mechanism used to generate the second authentication data is HMAC, the second authentication data may be generated in step 1060 by performing a hash function (e.g., MD5, SHA-1, SHA256, SHA512, etc.) on at least a portion of the CoAP message using a key (e.g., accessed in step 1030). And in one embodiment, the CoAP message (e.g., received in step 640) may be free of a key used to generate the second authentication data in step 1060.

In one embodiment, the key may be associated with the sender of the CoAP message (e.g., received in step 640). For example, the key may be a secret key or private key that is unique to the sender (e.g., computer system 110, computer system 120, etc.). Alternatively, the key may be associated with the recipient of the CoAP message (e.g., received in step 640). For example, the key may be a secret key or private key that is unique to the recipient (e.g., computer system 110, computer system 120, etc.).

Where a key associated with the recipient of the CoAP message (e.g., received in step 640) is used to generate the second authentication data in step 1060, the key may be stored locally at the recipient in one embodiment. For example, the key may be stored locally in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the key may be stored remotely (e.g., at another system or device) and accessed by the recipient in a secure manner in one embodiment.

Accordingly, a key associated with the recipient of the CoAP message may be accessed and used by the recipient to securely generate the second authentication data in step 1060.

Where a key associated with the sender of the CoAP message (e.g., received in step 640) is used to generate the second authentication data in step 1060, the recipient may access the key based on information about the sender in one embodiment. For example, using data (e.g., 700 of FIG. 7) which correlates or maps information about systems or devices (e.g., unique identifiers) to keys, the recipient (e.g., computer system 120) may access a key (e.g., "Key 1") associated with the sender (e.g., computer system 110) based on information about the recipient (e.g., the unique identifier of "cs110" associated with computer system 110). In one embodiment, the data (e.g., 700 of FIG. 7) may be stored locally in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the data (e.g., 700 of FIG. 7) may be stored remotely (e.g., at another system or device) and accessed by the recipient in a secure manner in one embodiment. Accordingly, a key associated with the sender of the CoAP message may be accessed and used by the recipient to securely generate the second authentication data in step 1060.

The size or length of the key (e.g., used to generate the second authentication data in step 1060) may be associated with the authentication mechanism used to generate the second authentication data in step 1060. For example, where the authentication mechanism of HMAC utilizing a SHA256 hash function is used to generate the authentication data, the length of the key may be 32 bytes. As another example, where the authentication mechanism of HMAC utilizing a SHA512 hash function is used to generate the authentication data, the length of the key may be 64 bytes.

As shown in FIG. 10, step 1070 may involve determining whether the second authentication data (e.g., generated in step 1060) correlates to the authentication data (e.g., included in the CoAP message received in step 640). If the second authentication data does not correlate to the authentication data, then it may be determined in step 1050 that the CoAP message (e.g., received in step 640) is invalid. Alternatively, if the second authentication data correlates to the authentication data, then it may be determined in step 1080 that the CoAP message (e.g., received in step 640) is valid.

In one embodiment, message validation (e.g., performed in accordance with one or more steps of process 1000) may be used to verify the authenticity of the sender of a CoAP message. For example, where the authentication data and second authentication data are each generated using at least one key (e.g., at least one secret key, at least one private key, at least one key which is accessible to authorized systems or devices, some combination thereof, etc.), the authenticity of the sender of a CoAP message may be verified if it is determined that the CoAP message is valid in step 1080.

In one embodiment, message validation (e.g., performed in accordance with one or more steps of process 1000) may be used to verify the integrity of a CoAP message. For example, where the authentication data and second authentication data are each generated based on data included in the CoAP message (e.g., message data, other data, etc.), the integrity of the CoAP message may be verified if it is determined that the CoAP message is valid in step 1080.

Although FIG. 10 depicts process 1000 as including a specific number of steps, it should be appreciated that process 1000 may include a different number of steps in other embodiments. Although FIG. 10 depicts process 1000 as including a specific ordering of steps, it should be appreciated that process 1000 may include a different ordering of steps in other embodiments.

Turning back to FIG. 6B, if it is determined in step 670 that the CoAP message (e.g., received in step 640) is valid, then at least one operation associated with the CoAP message may be performed in step 680. In one embodiment, step 680 may involve performing at least one operation using an operation component (e.g., 116 of computer system 110, 126 of computer system 120, etc.).

In one embodiment, the at least one operation performed in step 680 may include at least one operation associated with a method code (e.g., associated with data of portion 340 as shown in FIG. 3) in the CoAP message (e.g., 200, 500A, 500B, etc.) and/or at least one operation associated with an option (e.g., associated with data of portion 230 as shown in FIG. 2) of the CoAP message (e.g., 200, 500A, 500B, etc.). For example, where a CoAP message (e.g., 500A) is associated with a request to get a temperature (e.g., with a method code of "GET" and a "Uri-Path" option of "temperature" as depicted in FIG. 5A), the at least one operation performed in step 680 may include accessing a temperature (e.g., reading a temperature, accessing a stored temperature, etc.). In one embodiment, where the at least one operation is performed in step 680 using an operation component (e.g., 116 of computer system 110, 126 of computer system 120, etc.), the operation component may include a temperature sensor.

The at least one operation performed in step 680 may include communication of a second CoAP message (e.g., 500B) in one embodiment. For example, responsive to determining that a first CoAP message (e.g., 200, 500A, etc.) is valid (e.g., in step 670), the second CoAP message may be communicated in step 680 from the recipient of the first CoAP message to the sender of the first CoAP message.

The at least one operation performed in step 680 may include an operation associated with a request code (e.g., associated with data of portion 340 as shown in FIG. 3) of the CoAP message (e.g., 200, 500A, 500B, etc.) in one embodiment. For example, where a CoAP message (e.g., 500B) is associated with a response including data and/or content (e.g., with a response code of "Content" and a payload including data associated with a temperature as depicted in FIG. 5B), the at least one operation performed in step 680 may include processing of the data (e.g., to generate business intelligence, for charting, for analytics, etc.), performing one or more other operations, etc.

Alternatively, if it is determined in step 670 that the CoAP message (e.g., received in step 640) is not valid, then at least one other operation associated with the CoAP message may be performed in step 690. In one embodiment, step 690 may involve performing at least one other operation using an operation component (e.g., 116 of computer system 110, 126 of computer system 120, etc.).

In one embodiment, step 690 may involve acting responsive to a message validation failure such as a triggering of a message invalidity condition (e.g., corresponding to one or more steps of process 1100), another message validation failure (e.g., determined in step 660 and/or 670, determined in step 1070, etc.), etc. And in one embodiment, step 690 may involve acting on a suspected or detected replay attack.

In one embodiment, the at least one other operation performed in step 690 may include ignoring the received CoAP message (e.g., not sending a reply to the received CoAP message, performing no further processing related to the received CoAP message, etc.). In one embodiment, the at least one other operation performed in step 690 may include limiting access to the recipient (e.g., to computer system 110 where the CoAP message is received at computer system 110, to computer system 120 where the CoAP message is received at computer system 120, etc.) of the sender (e.g., computer system 110, computer system 120, at least one other system or device, etc.).

In one embodiment, one or more steps of process 600 may be repeated with respect to at least one other CoAP message. For example, where a first CoAP message is generated and communicated (e.g., in accordance with one or more steps of process 600), at least one other CoAP message may be generated and communicated (e.g., in accordance with one or more steps of process 600). In one embodiment, the first CoAP message may be a request, and the at least one other CoAP message may be at least one response (e.g., related to the request of the first CoAP message).

Although FIGS. 6A and 6B depict process 600 as including a specific number of steps, it should be appreciated that process 600 may include a different number of steps in other embodiments. Although FIGS. 6A and 6B depict process 600 as including a specific ordering of steps, it should be appreciated that process 600 may include a different ordering of steps in other embodiments.

Figure 12:
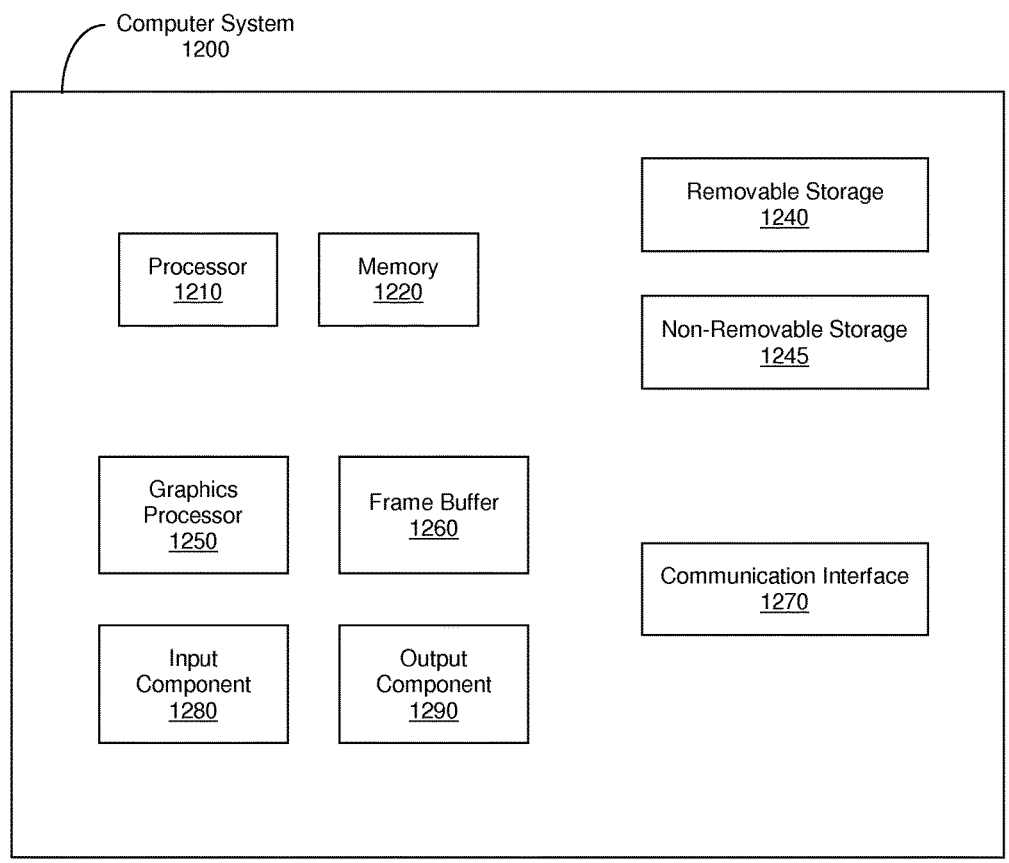
FIG. 12 shows a computer system upon which one or more embodiments may be implemented.

FIG. 12 shows computer system 1200 upon which one or more embodiments may be implemented. As shown in FIG. 12, computer system 1200 may include processor 1210, memory 1220, removable storage 1240, non-removable storage 1245, graphics processor 1250, frame buffer 1260, communication interface 1270, input component 1280, and output component 1290. One or more embodiments may be implemented by execution of computer-readable instructions or computer-executable instructions that may reside in at least one component of computer system 1200 and which may be used as a part of a general purpose computer network. In one embodiment, computer system 1200 may be a general-purpose computer system, an embedded computer system, a laptop computer system, a hand-held computer system, a portable computer system and/or portable electronic device, a stand-alone computer system, etc.

In one embodiment, computer system 1200 may be used to implement computer system 110, computer system 120, another system or device configured to communicate CoAP messages, some combination thereof, etc. And in one embodiment, one or more components of computer system 1200 may be disposed in and/or coupled with a housing or enclosure.

In one embodiment, computer system 1200 may include at least one processor (e.g., 1210) and at least one memory (e.g., 1220). Processor 1210 may be or include a central processing unit (CPU) or other type of processor. Depending on the configuration and/or type of computer system environment, memory 1220 may be or include volatile memory (e.g., RAM), non-volatile memory (e.g., ROM, flash memory, etc.), some combination thereof, etc. Additionally, memory 1220 may be removable, non-removable, etc.

In one embodiment, computer system 1200 may include additional storage (e.g., removable storage 1240, non-removable storage 1245, etc.). Removable storage 1240 and/or non-removable storage 1245 may include volatile memory, non-volatile memory, some combination thereof, etc. Additionally, removable storage 1240 and/or non-removable storage 1245 may include CD-ROM, digital versatile disks (DVD), other optical storage, magnetic cassettes, magnetic tape, magnetic disk storage, other magnetic storage devices, or any other medium which can be used to store information for access by computer system 1200.

As shown in FIG. 12, computer system 1200 may communicate with other systems, components, or devices via communication interface 1270. Communication interface 1270 may be used to implement at least one communication interface (e.g., 118, 128, etc.) of one or more components of system 100 in one embodiment.

Communication interface 1270 may embody computer-readable instructions, data structures, program modules or other data in a modulated data signal (e.g., a carrier wave) or other transport mechanism. By way of example, and not limitation, communication interface 1270 may couple to and/or communicate over wired media (e.g., a wired network, direct-wired connection, etc.) and/or wireless media (e.g., a wireless network, a wireless connection utilizing acoustic, RF, infrared, or other wireless signaling, etc.).

Communication interface 1270 may also couple computer system 1200 to one or more external input components (e.g., a keyboard, a mouse, a trackball, a joystick, a pen, a voice input device, a touch input device, etc.). In one embodiment, communication interface 1270 may couple computer system 1200 to one or more external output components (e.g., a display, a speaker, a printer, etc.). And in one embodiment, communication interface 1270 may include a plug, receptacle, cable, slot or any other component capable of coupling to and/or communicating with another component, device, system, etc.

Input component 1280 may include any component capable of receiving or allowing the input of information. For example, input component 1280 may be or include a keyboard, at least one button or key, a mouse, a trackball, a joystick, a pen, a voice input device, a touch input device, another type of input component, etc. Output component 1290 may include any component capable of transmitting or allowing the output of information. For example, output component 1290 may be or include a display, a speaker, a printer, another type of output component, etc.

As shown in FIG. 12, graphics processor 1250 may perform graphics processing operations on graphical data stored in frame buffer 1260 or another memory (e.g., 1220, 1240, 1245, etc.) of computer system 1200. Graphical data stored in frame buffer 1260 may be accessed, processed, and/or modified by components (e.g., graphics processor 1250, processor 1210, some combination thereof, etc.) of computer system 1200 and/or components of other systems, other devices, etc. Additionally, the graphical data may be accessed (e.g., by graphics processor 1250) and displayed on an output device coupled to computer system 1200 in one embodiment.

In one embodiment, a memory of computer system 1200 (e.g., memory 1220, removable storage 1240, non-removable storage 1245, frame buffer 1260, some combination thereof, etc.) may be a computer-readable medium (or computer-usable medium, or computer-readable storage medium, etc.) and may include instructions that when executed by a processor (e.g., 1210, 1250, etc.) implement a method of increasing communication security (e.g., in accordance with process 600 of FIGS. 6A and 6B), generating a CoAP message (e.g., in accordance with process 800 of FIG. 8), processing a CoAP message (e.g., in accordance with process 900 of FIG. 9), performing message validation (e.g., in accordance with process 1000 of FIG. 10), determining whether at least one condition for message invalidity is met (e.g., in accordance with process 1100 of FIG. 11), some combination thereof, etc. And in one embodiment, a computer-readable medium of computer system 1200 may be implemented in and/or using at least one die of at least one integrated circuit (e.g., at least one application-specific integrated circuit (ASIC), at least one system-on-a-chip (SOC), at least one programmable system-on-a-chip (PSOC), another type of integrated circuit, etc.).

In the foregoing specification, embodiments have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction thereto. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of increasing communication security, said method comprising:
   receiving, from a first computer system at a second computer system, a Constrained Application Protocol (CoAP) message, wherein said CoAP message includes authentication data and a header, wherein said CoAP message further includes message data separate from said header;
   performing message validation based on said authentication data, wherein said performing message validation further comprises accessing an authentication mechanism identifier from said message data, wherein said performing message validation further comprises performing said message validation using an authentication mechanism associated with said authentication mechanism identifier, and wherein said performing message validation further comprises:
      accessing a unique identifier from said CoAP message, wherein said unique identifier is associated with said first computer system;
      accessing a key based on said unique identifier;
      generating second authentication data based on at least a portion of said CoAP message, and wherein said generating second authentication data further comprises generating said second authentication data using said key; and
      comparing said second authentication data to said authentication data to determine whether said CoAP message is valid; and
   if said CoAP message is valid, performing at least one operation associated with said CoAP message.

2. The method of claim 1, wherein said at least one operation is selected from a group consisting of: an operation associated with a method code in said CoAP message; an operation associated with an option in said CoAP message; and a communication of a second CoAP message, associated with said CoAP message, from said second computer system to said first computer system.

3. The method of claim 1 further comprising:
   if said CoAP message is invalid, performing at least one other operation associated with said CoAP message.

4. The method of claim 3, wherein said at least one other operation is selected from a group consisting of: ignoring said CoAP message; and limiting access of said first computer system to said second computer system.

5. The method of claim 1, wherein said performing message validation further comprises:
   if said second authentication data correlates to said authentication data, determining that said CoAP message is valid; and
   if said second authentication data does not correlate to said authentication data, determining that said CoAP message is invalid.

6. The method of claim 1, wherein said generating second authentication data further comprises generating said second authentication data using said authentication mechanism.

7. The method of claim 6, wherein said authentication mechanism is selected from a group consisting of hash-based message authentication code (HMAC) utilizing a MD5 hash function, HMAC utilizing a SHA-1 hash function, HMAC utilizing a SHA256 hash function, HMAC utilizing a SHA512 hash function, OAuth, OAuth 2.0, and OpenID.

8. The method of claim 1 further comprising:
   processing said CoAP message, and wherein said processing said CoAP message comprises:
      determining a length of said authentication data based on said authentication mechanism identifier;
      removing a portion of said CoAP message based on said length, wherein said portion of said CoAP message includes at least a portion of said authentication data; and
      if said CoAP message is free of a payload responsive to said removing said portion of said CoAP message, removing a payload marker from said CoAP message.

9. The method of claim 1, wherein said performing message validation comprises determining that said CoAP message is invalid if a condition is not met, and wherein said condition is selected from a group consisting of: said CoAP message includes a nonce; said nonce is different from another nonce associated with a previously-received message; a payload of said CoAP message is at least a predetermined size; and a key associated with said first computer system is accessed.

10. The method of claim 1, wherein said CoAP message includes a nonce, and wherein said nonce is selected from a group consisting of a random number, a pseudorandom number, and an incremental number, and a timestamp.

11. The method of claim 1, wherein said header is separate from at least one other portion of said CoAP message including said authentication data.

12. The method of claim 1, wherein said receiving comprises receiving said CoAP message using Datagram Transport Layer Security (DTLS).

13. The method of claim 1, wherein said message data is selected from a group consisting of data associated with a token, data associated with at least one option, data associated with a payload marker, and data associated with at least a portion of a payload.

14. A non-transitory computer-readable medium having instructions stored thereon that, if executed by a computer system, cause said computer system to perform operations comprising:
    receiving, from a first computer system at a second computer system, a Constrained Application Protocol (CoAP) message, wherein said CoAP message includes authentication data and a header, wherein said CoAP message further includes message data separate from said header;
    performing message validation based on said authentication data, wherein said performing message validation further comprises accessing an authentication mechanism identifier from said message data, wherein said performing message validation further comprises performing said message validation using an authentication mechanism associated with said authentication mechanism identifier, and wherein said performing message validation further comprises:
        accessing a unique identifier from said CoAP message, wherein said unique identifier is associated with said first computer system;
        accessing a key based on said unique identifier;
        generating second authentication data based on at least a portion of said CoAP message, and wherein said generating second authentication data further comprises generating said second authentication data using said key; and
        comparing said second authentication data to said authentication data to determine whether said CoAP message is valid; and
    if said CoAP message is valid, performing at least one operation associated with said CoAP message.

15. The computer-readable medium of claim 14, wherein said at least one operation is selected from a group consisting of: an operation associated with a method code in said CoAP message; an operation associated with an option in said CoAP message; and a communication of a second CoAP message, associated with said CoAP message, from said second computer system to said first computer system.

16. The computer-readable medium of claim 14, wherein said operations further include:
    if said CoAP message is invalid, performing at least one other operation associated with said CoAP message.

17. The computer-readable medium of claim 16, wherein said at least one other operation is selected from a group consisting of: ignoring said CoAP message; and limiting access of said first computer system to said second computer system.

18. The computer-readable medium of claim 14, wherein said performing message validation further comprises:
    if said second authentication data correlates to said authentication data, determining that said CoAP message is valid; and
    if said second authentication data does not correlate to said authentication data, determining that said CoAP message is invalid.

19. The computer-readable medium of claim 14, wherein said generating second authentication data further comprises generating said second authentication data using said authentication mechanism.

20. The computer-readable medium of claim 19, wherein said authentication mechanism is selected from a group consisting of hash-based message authentication code (HMAC) utilizing a MD5 hash function, HMAC utilizing a SHA-1 hash function, HMAC utilizing a SHA256 hash function, HMAC utilizing a SHA512 hash function, OAuth, OAuth 2.0, and OpenID.

21. The computer-readable medium of claim 14, wherein said message data is selected from a group consisting of data associated with a token, data associated with at least one option, data associated with a payload marker, and data associated with at least a portion of a payload.

22. A system comprising a processor and a memory, wherein said memory comprises instructions for causing said processor to perform operations comprising:
    receiving, from a first computer system at a second computer system, a Constrained Application Protocol (CoAP) message, wherein said CoAP message includes authentication data and a header, wherein said CoAP message further includes message data separate from said header;
    performing message validation based on said authentication data, wherein said performing message validation further comprises accessing an authentication mechanism identifier from said message data, wherein said performing message validation further comprises performing said message validation using an authentication mechanism associated with said authentication mechanism identifier, and wherein said performing message validation further comprises:
        accessing a unique identifier from said CoAP message, wherein said unique identifier is associated with said first computer system;
        accessing a key based on said unique identifier;
        generating second authentication data based on at least a portion of said CoAP message, and wherein said generating second authentication data further comprises generating said second authentication data using said key; and
        comparing said second authentication data to said authentication data to determine whether said CoAP message is valid; and
    if said CoAP message is valid, performing at least one operation associated with said CoAP message.

23. The system of claim 22, wherein said message data is selected from a group consisting of data associated with a token, data associated with at least one option, data associated with a payload marker, and data associated with at least a portion of a payload.

* * * * *